United States Patent
Wang

(10) Patent No.: US 11,674,634 B2
(45) Date of Patent: Jun. 13, 2023

(54) POSITION ADJUSTMENT APPARATUS AND AUTOMOBILE CALIBRATION DEVICE

(71) Applicant: AUTEL INTELLIGENT TECHNOLOGY CORP., LTD., Guangdong (CN)

(72) Inventor: Xiaolong Wang, Guangdong (CN)

(73) Assignee: AUTEL INTELLIGENT TECHNOLOGY CORP., LTD., Guangdong (CN)

(*) Notice: Subject to any disclaimer, the term of this patent is extended or adjusted under 35 U.S.C. 154(b) by 741 days.

(21) Appl. No.: 16/674,799

(22) Filed: Nov. 5, 2019

(65) Prior Publication Data
US 2020/0174097 A1 Jun. 4, 2020

Related U.S. Application Data

(63) Continuation-in-part of application No. PCT/CN2019/083532, filed on Apr. 19, 2019.

(30) Foreign Application Priority Data

Apr. 20, 2018 (CN) .......................... 201810362752.0

(51) Int. Cl.
*F16M 11/04* (2006.01)
*F16M 11/20* (2006.01)
*F16M 11/24* (2006.01)

(52) U.S. Cl.
CPC ....... *F16M 11/2085* (2013.01); *F16M 11/045* (2013.01); *F16M 11/24* (2013.01)

(58) Field of Classification Search
CPC .... F16M 11/045; F16M 11/046; F16M 11/28; F16M 11/043; F16M 11/048;
(Continued)

(56) References Cited

U.S. PATENT DOCUMENTS 4,229,136 A * 10/1980 Panissidi .............. B25J 19/0012
                                                       414/730
4,557,657 A * 12/1985 Olson ............... H01L 21/67754
                                                        901/14
(Continued)

FOREIGN PATENT DOCUMENTS

CN   203573166 U   4/2014
CN   205743192 U   11/2016
(Continued)

OTHER PUBLICATIONS

International Search Report dated Jul. 29, 2019; PCT/CN2019/083532.

*Primary Examiner* — Jonathan Liu
*Assistant Examiner* — Guang H Guan

(57) ABSTRACT

This specification relates to the fields of automobile maintenance and device calibration technologies and discloses a position adjustment apparatus and an automobile calibration device. The position adjustment apparatus includes a slide member, a supporting member and an adjustment member. The supporting member is movably mounted at the slide member. One of the slide member and the supporting member includes a rack. The adjustment member includes a gear. The gear is meshed with the rack. When rotating, the gear can drive the rack to move in a preset direction, to enable the supporting member to move in the preset direction with respect to the slide member. By means of the gear engagement between the gear and the rack, the supporting member can move stably and precisely in the preset direction with respect to the slide member, so that the automobile calibration device and an automobile to be calibrated can be aligned conveniently and precisely.

17 Claims, 26 Drawing Sheets

(58) Field of Classification Search
CPC ........... F16M 11/2085; F16M 11/2092; F16M 11/24; F16M 11/42; G01S 7/40; G01B 11/27; G01B 11/272; G01B 11/275; G01B 11/2755

See application file for complete search history.

(56) References Cited

U.S. PATENT DOCUMENTS

| | | | | |
|---|---|---|---|---|
| 5,718,408 | A * | 2/1998 | Lin | B23Q 1/25 248/676 |
| 6,823,601 | B2 * | 11/2004 | Murray | G01B 11/27 33/645 |
| 7,376,492 | B2 * | 5/2008 | Srack | G01B 5/0025 701/1 |
| 7,707,907 | B2 * | 5/2010 | Bonev | B25J 9/106 74/490.03 |
| 8,628,238 | B2 * | 1/2014 | Fesmire | G01K 17/00 374/45 |
| 9,074,726 | B2 * | 7/2015 | Altshuler | G02B 21/0008 |
| 9,611,976 | B2 * | 4/2017 | Yang | B65H 3/00 |
| 9,645,051 | B2 * | 5/2017 | Jin | G01M 17/007 |
| 9,904,150 | B1 * | 2/2018 | Zhu | F16M 11/425 |
| 10,323,936 | B2 * | 6/2019 | Leikert | G01B 11/2755 |
| 10,414,040 | B2 * | 9/2019 | Wells | B25J 5/02 |
| D863,079 | S * | 10/2019 | Cai | D10/65 |
| 10,585,336 | B2 * | 3/2020 | Lv | F16M 13/02 |
| 10,634,488 | B2 * | 4/2020 | Stieff | G01S 7/4972 |
| D883,119 | S * | 5/2020 | Cai | D10/103 |
| D883,120 | S * | 5/2020 | Cai | G01B 11/275 D10/103 |
| D883,121 | S * | 5/2020 | Cai | D10/103 |
| D883,122 | S * | 5/2020 | Cai | G01B 5/0025 D10/103 |
| D883,123 | S * | 5/2020 | Cai | D10/103 |
| D899,471 | S * | 10/2020 | Liu | D15/122 |
| 10,794,996 | B2 * | 10/2020 | Qiu | G01S 7/4026 |
| 10,821,607 | B2 * | 11/2020 | Chen | B60S 5/00 |
| 10,921,426 | B2 * | 2/2021 | Tang | G01S 7/40 |
| 11,002,574 | B2 * | 5/2021 | Qiu | G01D 18/00 |
| 11,009,587 | B2 * | 5/2021 | Conrad | G01S 7/4004 |
| 11,092,667 | B2 * | 8/2021 | Harmer | G01B 11/275 |
| 11,112,284 | B2 * | 9/2021 | Bartkowiak | F16M 11/22 |
| 11,119,189 | B2 * | 9/2021 | Lai | G01M 17/007 |
| D935,926 | S * | 11/2021 | Wang | B25J 19/0012 D10/103 |
| D937,111 | S * | 11/2021 | Wang | D10/103 |
| 11,162,826 | B2 * | 11/2021 | Qiu | G01S 7/497 |
| 11,175,381 | B2 * | 11/2021 | Wang | G01S 13/931 |
| 11,175,383 | B2 * | 11/2021 | Qiu | G01S 7/4972 |
| D942,880 | S * | 2/2022 | Wang | D10/103 |
| 11,243,074 | B2 * | 2/2022 | DeBoer | G01B 11/275 |
| 11,279,038 | B2 * | 3/2022 | Chen | B25J 9/1692 |
| 11,325,597 | B2 * | 5/2022 | Qiu | G05D 1/0891 |
| 11,465,632 | B2 * | 10/2022 | Corghi | G01B 11/2755 |
| 2007/0158627 | A1 * | 7/2007 | Dittmer | F16M 11/18 248/157 |
| 2020/0141724 | A1 * | 5/2020 | Lawrence | G01B 11/272 |
| 2020/0174097 | A1 * | 6/2020 | Wang | G01S 7/40 |
| 2020/0239009 | A1 * | 7/2020 | Corghi | G01B 11/2755 |
| 2021/0048525 | A1 * | 2/2021 | Lai | G01S 7/4026 |
| 2021/0069872 | A1 * | 3/2021 | Wang | G01S 7/4026 |

FOREIGN PATENT DOCUMENTS

| | | |
|---|---|---|
| CN | 106405526 A | 2/2017 |
| CN | 107856649 A | 3/2018 |
| CN | 108345321 A | 7/2018 |
| CN | 108453646 A | 8/2018 |
| CN | 108454584 A | 8/2018 |
| CN | 108581982 A | 9/2018 |
| DE | 202015008954 U1 | 4/2016 |

* cited by examiner

POSITION ADJUSTMENT APPARATUS AND AUTOMOBILE CALIBRATION DEVICE

This application claims priority to Chinese application No. 201810362752.0 filed on Apr. 20, 2018, hereby incorporated herein by reference in its entirety.

BACKGROUND

Technical Field

The present invention relates to the fields of automobile maintenance and device calibration technologies and in particular, to a position adjustment apparatus and an automobile calibration device having the position adjustment apparatus.

Related Art

In the field of automobile maintenance, in a process of four-wheel positioning, advanced driver-assistance systems (ADAS) calibration, or the like, it is required to move an automobile calibration device to the front end or rear end of an automobile and keep the centerline of a calibration device to be aligned with the centerline of the automobile to calibrate driver assistance devices such as a camera or a radar.

At present, generally, a calibration device is pulled manually or an external tow truck equipment is configured to move the automobile calibration device. These manners of moving the automobile calibration device mainly have the following two defects:

1. Operations are complex and precision is low. Repeated measurements and observations are required to align centers during moving.

2. Originally adjusted parameters and constraints (for example, a deviation angle and a pitch angle) may change during pulling and need to be adjusted repeatedly.

SUMMARY

Embodiments of the present invention provide a position adjustment apparatus and an automobile calibration device having the position adjustment apparatus.

The embodiments of the present invention provide the following technical solutions:

A position adjustment apparatus includes a slide member, a supporting member and an adjustment member. The supporting member is movably mounted at the slide member. One of the slide member and the supporting member includes a rack. The adjustment member includes a gear. The gear is meshed with the rack. When rotating, the gear can drive the rack to move in a preset direction, to enable the supporting member to move in the preset direction with respect to the slide member.

Optionally, the position adjustment apparatus further includes a connection assembly, the supporting member being mounted at the slide member via the connection assembly.

Optionally, the connection assembly includes a linear slide rail and a slide rail fixing block, one of the linear slide rail and the slide rail fixing block being mounted at the slide member and the other of the linear slide rail and the slide rail fixing block being mounted at the supporting member;

the linear slide rail is disposed in the preset direction; and the slide rail fixing block is sleeved over the linear slide rail, the linear slide rail being slidable in the preset direction with respect to the slide rail fixing block.

Optionally, two slide rail fixing blocks are arranged in the preset direction and the two slide rail fixing blocks are both sleeved over the linear slide rail.

Optionally, the adjustment member includes a rod body, a knob portion and the gear;

the rod body passes through the slide member, the rod body is mounted at the slide member and the rod body is rotatable with respect to the slide member; and the gear and the knob portion are respectively disposed at two ends of the rod body.

Optionally, the rack has a bar shape, is disposed in the preset direction and includes a plurality of gear teeth perpendicular to the preset direction; and the gear is a spur gear and the gear is meshed with the gear teeth of the rack.

To resolve the foregoing technical problem, the embodiments of the present invention further provide the following technical solution:

An automobile calibration device includes a support apparatus and the foregoing position adjustment apparatus. The position adjustment apparatus is mounted at the support apparatus and is movable in a vertical direction with respect to the support apparatus.

Optionally, the automobile calibration device further includes a drive assembly and the drive assembly is configured to drive the position adjustment apparatus to move in the vertical direction with respect to the support apparatus.

Optionally, the drive assembly includes a first drive mechanism and a transmission mechanism;

the first drive mechanism is connected to the transmission mechanism and the first drive mechanism is configured to drive the transmission mechanism to move; and the transmission mechanism is configured to enable the position adjustment apparatus to move in the vertical direction with respect to the support apparatus.

Optionally, the transmission mechanism includes an elevation screw rod, the elevation screw rod being movably mounted at the support apparatus, the elevation screw rod being disposed vertically and the elevation screw rod being rotatable around the central axis of the elevation screw rod;

the slide member is sleeved over the elevation screw rod, the elevation screw rod being threaded to the slide member; and the first drive mechanism is connected to the elevation screw rod and the first drive mechanism is configured to drive the elevation screw rod to rotate around the central axis of the elevation screw rod, to enable the position adjustment apparatus to move in the vertical direction with respect to the support apparatus.

Optionally, the first drive mechanism includes a motor assembly; and the motor assembly includes a motor, the motor being configured to drive the elevation screw rod to rotate around the central axis of the elevation screw rod.

Optionally, the motor assembly further includes a first synchronous gear, a second synchronous gear and a drive belt;

the motor is fixedly mounted at the support apparatus, the first synchronous gear is fixedly mounted at a rotating shaft of the motor, the second synchronous gear is fixedly mounted at the elevation screw rod and the drive belt is sleeved over the first synchronous gear and the second synchronous gear; and when the motor rotates, the first synchronous gear drives the second synchronous gear through the drive belt to rotate, to enable the elevation screw rod to rotate around the central axis of the elevation screw rod.

Optionally, when the motor rotates in a first rotational direction, the position adjustment apparatus ascends in the vertical direction with respect to the support apparatus;

when the motor rotates in a second rotational direction, the position adjustment apparatus descends in the vertical direction with respect to the support apparatus; and the first rotational direction and the second rotational direction are opposite.

Optionally, the drive belt includes an assembly surface and a peripheral surface of the first synchronous gear and a peripheral surface of the second synchronous gear are both provided with gear teeth, the gear teeth of the first synchronous gear and the gear teeth of the second synchronous gear being both in contact with the assembly surface and the assembly surface including a toothed area and a non-toothed area;

the toothed area is capable of being meshed with the first synchronous gear and the second synchronous gear and the non-toothed area is capable of being in contact with the first synchronous gear and the second synchronous gear;

when the motor rotates and the toothed area is meshed with and the first synchronous gear or the toothed area is meshed with the second synchronous gear, a rate of the second synchronous gear is a first preset rate value;

when the motor rotates and the first synchronous gear and the second synchronous gear are only in contact with the non-toothed area, a rate of the second synchronous gear is a second preset rate value; and the first preset rate value is greater than the second preset rate value.

Optionally, the automobile calibration device further includes a second drive mechanism, where the second drive mechanism includes a first helical gear, a second helical gear and an elevation handwheel;

the elevation handwheel is mounted at the support apparatus, the first helical gear is fixedly connected to the elevation handwheel, and the second helical gear is fixedly connected to the elevation screw rod, the first helical gear being meshed with the second helical gear; and an angle is formed between a rotational axis of the elevation handwheel and the vertical direction.

Optionally, the slide member includes a slide member body and a slide block; and the slide block is fixedly mounted at the slide member body and a threaded through hole is opened in the slide block, the threaded through hole being sleeved over the elevation screw rod and the threaded through hole being threaded to the elevation screw rod.

Optionally, the slide member includes a guide block and the guide block is fixedly mounted at the slide member body;

the support apparatus includes an elevation guiderail, the elevation guiderail being disposed vertically; and the guide block is sleeved over the elevation guiderail.

Optionally, the automobile calibration device further includes a slide apparatus, where the slide apparatus is mounted at the position adjustment apparatus and the position adjustment apparatus being configured to enable the slide apparatus to move horizontally.

Optionally, the slide apparatus includes a guiderail and a slide assembly;

the guiderail is mounted at the position adjustment apparatus; and the slide assembly is mounted at the guiderail and the slide assembly is horizontally movable with respect to the guiderail.

Optionally, the guiderail includes a first surface and a second surface perpendicular to each other, the first surface being provided with a first slide groove, the second surface being provided with a second slide groove and the first slide groove and the second slide groove being disposed in parallel;

the slide assembly includes a plate body, a first slide member and a second slide member the first slide member and the second slide member being mounted at the plate body; and the first slide member is movably mounted at the first slide groove, the first slide member is slidable along the first slide groove, the second slide member is movably mounted at the second slide groove and the second slide member is slidable along the second slide groove, so that the plate body is slidable along the guiderail.

Optionally, the slide apparatus further includes a hanging assembly; and the hanging assembly includes a mounting member and a hanging member, the hanging member being fixedly mounted at the plate body through the mounting member.

Optionally, the mounting member includes a base portion, a first extending portion and a second extending portion;

the first extending portion and the second extending portion respectively extend from two opposite sides of the base portion;

two opposite sides of the plate body are respectively provided with a first mounting groove and a second mounting groove, the first mounting groove and the second mounting groove being aligned in a sliding direction of the plate body;

an end, away from the base portion, of the first extending portion is inserted in the first mounting groove and is fixedly connected to the plate body; and an end, away from the base portion, of the second extending portion is inserted in the second mounting groove and is fixedly connected to the plate body.

One of the slide member and the supporting member includes a first member. The adjustment member includes a second member. The second member is meshed with the first member. Moreover, the second member can drive the first member to move in a preset direction, to enable the supporting member to move in the preset direction with respect to the slide member. By means of the engagement between the first member and the second member, the supporting member can move stably and precisely in the preset direction with respect to the slide member, so that the position of the automobile calibration device with respect to an automobile to be calibrated can be adjusted conveniently and precisely. And thus, it is also convenient for the use to precisely move the supporting member, in a case that when the supporting member supports a calibrator, the position of the calibrator can be precisely aligned with the device to be calibrated by the calibrator on the automobile, such as a radar or a camera.

BRIEF DESCRIPTION OF THE DRAWINGS

One or more embodiments are exemplarily described with reference to corresponding accompanying drawings. The exemplary descriptions do not constitute any limitation to the embodiments. Components having the same reference numerals in the accompanying drawings are similar com

DETAILED DESCRIPTION

For ease of understanding of the present invention, the present invention is described below in further detail with reference to the accompanying drawings and specific embodiments. It should be noted that when an element is "fixed" on another element, the element may be directly fixed on the other element or one or more intervening elements may be present. When an element is "connected" to another element, the element may be directly connected to the other element or one or more intervening elements may be present. The terms "vertical", "horizontal", "left", "right", "inside", "outside" and similar expressions used in this specification are only used to facilitate description.

Unless otherwise defined, all technical terms and scientific terms used in this specification have the same meaning as commonly understood by a person skilled in the art to which the present invention belongs. The terms used in this specification of the present invention are merely used to describe specific embodiments but are not used to limit the present invention. The term "and/or" used in this specification includes any or all combinations of one or more listed items.

In addition, technical features described below in different embodiments of the present invention can be combined with each other without causing any conflict.

Figure 1:
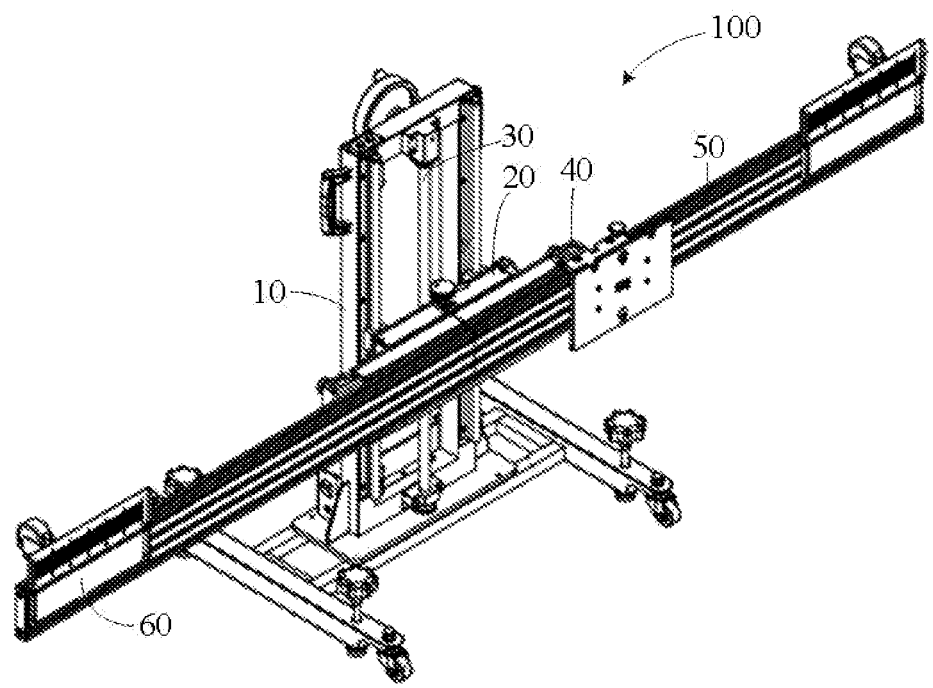
- FIG. 1 is a schematic structural view of an automobile calibration device according to one embodiment of the present invention.

Referring to FIG. 1, an automobile calibration device 100 provided in one embodiment of the present invention includes a support apparatus 10, a position adjustment apparatus 20, a drive assembly 30, a clamping apparatus 40, a slide apparatus 50 and a scale apparatus 60. The position adjustment apparatus 20 is mounted at the support apparatus 10. The position adjustment apparatus 20 is movable in a vertical direction with respect to the support apparatus 10. The drive assembly 30 is connected to the support apparatus 10 and the position adjustment apparatus 20. The drive assembly 30 is configured to drive the position adjustment apparatus 20 to move in the vertical direction with respect to the support apparatus 10. The slide apparatus 50 is mounted at the position adjustment apparatus 20 through the clamping apparatus 40. The position adjustment apparatus 20 is configured to adjust the horizontal position of the slide apparatus 50. The slide apparatus 50 includes a mechanism to clamp a vehicle calibration apparatus (also called calibrator), for example, a calibration apparatus configured to calibrate a lane keeping system of the vehicle. The scale apparatus 60 is mounted at the slide apparatus 50 and is configured to assist with position adjustment of the automobile calibration device 100.

Figure 2:
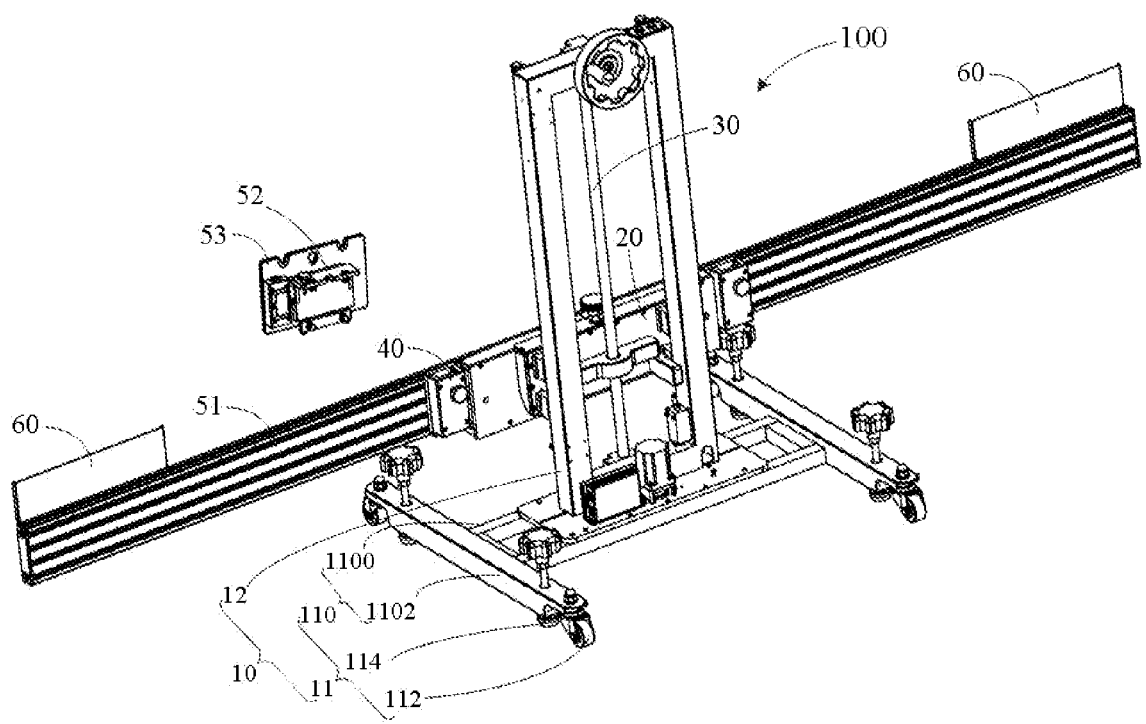
FIG. 2 is a schematic structural view of the automobile calibration device shown in FIG. 1 from another angle.

Referring to FIG. 2, in the embodiments, the support apparatus 10 includes a base support 11 and a vertical support 12. An end of the vertical support 12 is connected to the base support 11 and the base support 11 supports the vertical support 12.

The base support 11 includes a base support body 110, a roller 112 and a height adjustment member 114. The base support body 110 approximately has an "I" shape and includes a bearing structure 1100 and two lateral beams 1102. A plurality of hollow regions is formed in the bearing structure 1100 for a lighter weight. Two ends of the bearing structure 1100 are respectively connected to one lateral beam 1102.

The roller 112 is mounted at the bottom surface of the lateral beam 1102 and is configured to facilitate the movement of the base support 11. In this embodiment, the roller 112 is an omnidirectional roller to enable the base support 11 to move in any direction. There are four rollers 112. One roller 112 is disposed at each of two ends of each lateral beam 1102. It may be understood that, in some other embodiments, the shape of the base support body 110 may be changed according to an actual requirement, but is not limited to the "I" shape. For example, the base support body 110 may be rectangular. The quantity of the rollers 112 may be increased or reduced according to an actual requirement, provided that there are at least three rollers 112.

The height adjustment member 114 is mounted at the lateral beam 1102 and is configured to adjust the height of the base support body 110. In this embodiment, the height adjustment member 114 is an adjustment handwheel and there are four adjustment handwheels. The four adjustment handwheels 114 are distributed in a rectangular form. One adjustment handwheel 114 is provided at each of two ends of each lateral beam 1102. The four adjustment handwheels 114 are combined to adjust the overall horizontal height and tilt angle of the base support body 110. It may be understood that, the height adjustment member 114 may be another apparatus that can adjust height. The quantity of the height adjustment members 114 may be increased according to an actual requirement, provided that there are at least three height adjustment members 114.

Figure 3:
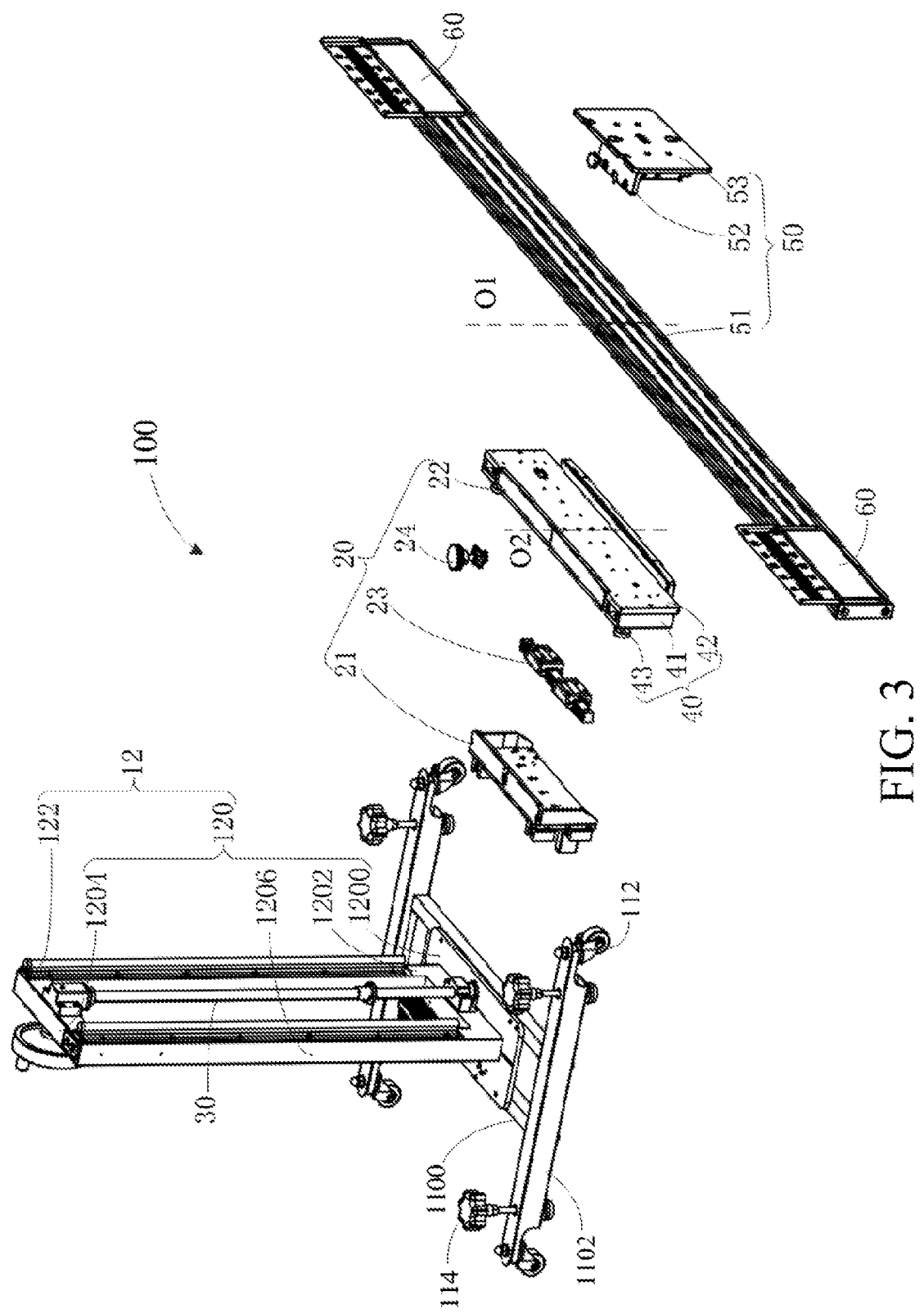
FIG. 3 is an exploded view of the automobile calibration device shown in FIG. 1.

Referring to FIG. 3, the vertical support 12 is mounted on the upper surface of the bearing structure 1100 and includes a vertical support body 120 and an elevation guiderail 122 mounted at the vertical support body 120.

The vertical support body 120 includes a mounting plate 1200, a mounting groove body 1202, a top beam 1204 and two vertical beams 1206. The mounting plate 1200 is mounted at the upper surface of the bearing structure 1100. A maintenance opening 1208 (see FIG. 7) is provided in the mounting plate 1200. The mounting groove body 1202 is inserted in the upper surface of the mounting plate 1200 and the maintenance opening 1208 is in communication with the mounting groove body 1202. Both the top beam 1204 and the two vertical beams 1206 have hollow structures. One end of each vertical beam 1206 is connected to the top beam 1204 and the other end of each vertical beam 1206 is connected to the mounting groove body 1202. The mounting groove body 1202, the top beam 1204 and the two vertical beams 1206 form a rectangular frame structure. The mounting groove body 1202, the top beam 1204 and the two vertical beams 1206 are internally in communication with each other to form a wiring groove structure (not shown). A wiring opening (not shown) is provided in the mounting groove body 1202. The wiring opening is in communication with the wiring groove structure.

Two elevation guiderails 122 are respectively mounted at the two vertical beams 1206. The elevation guiderail 122 is configured to guide the position adjustment apparatus 20 to move in the vertical direction. The elevation guiderail 122 is a vertical rod and is disposed in the vertical direction. The two elevation guiderails 122 are disposed in the vertical direction at a preset distance from each other. Each elevation guiderail 122 is mounted at a lateral surface of one corresponding vertical beam 1206. It may be understood that, in some other embodiments, the quantity of the elevation guiderail 122 may be increased or reduced according to an actual case. For example, there may be one elevation guiderail 122 or three elevation guiderails 122.

The position adjustment apparatus 20 is movably mounted at the two elevation guiderails 122 and is movable in the vertical direction with respect to the two elevation guiderails 122. In other embodiments, the position adjustment apparatus 20 can be detachable mounted at the support apparatus (10), i.e., the position adjustment apparatus 20 can be fixed at one or more preset heights when the position adjustment apparatus 20 is mounted on the support apparatus (10), except for sliding on the support apparatus (10). The position adjustment apparatus 20 includes a slide member 21, a supporting member 22, a connection assembly 23 and an adjustment member 24. The slide member 21 is movably mounted at the elevation guiderail 122 and can move in the vertical direction with respect to the elevation guiderail 122. The supporting member 22 is mounted at the slide member 21 via the connection assembly 23. The supporting member 22 is movable in a preset direction such as a horizontal direction with respect to the slide member 21. The supporting member 22 is configured to support the clamping apparatus 40. The adjustment member 24 is connected to the slide member 21 and the supporting member 22 and is configured to adjust the horizontal position of the supporting member 22.

Figure 4:
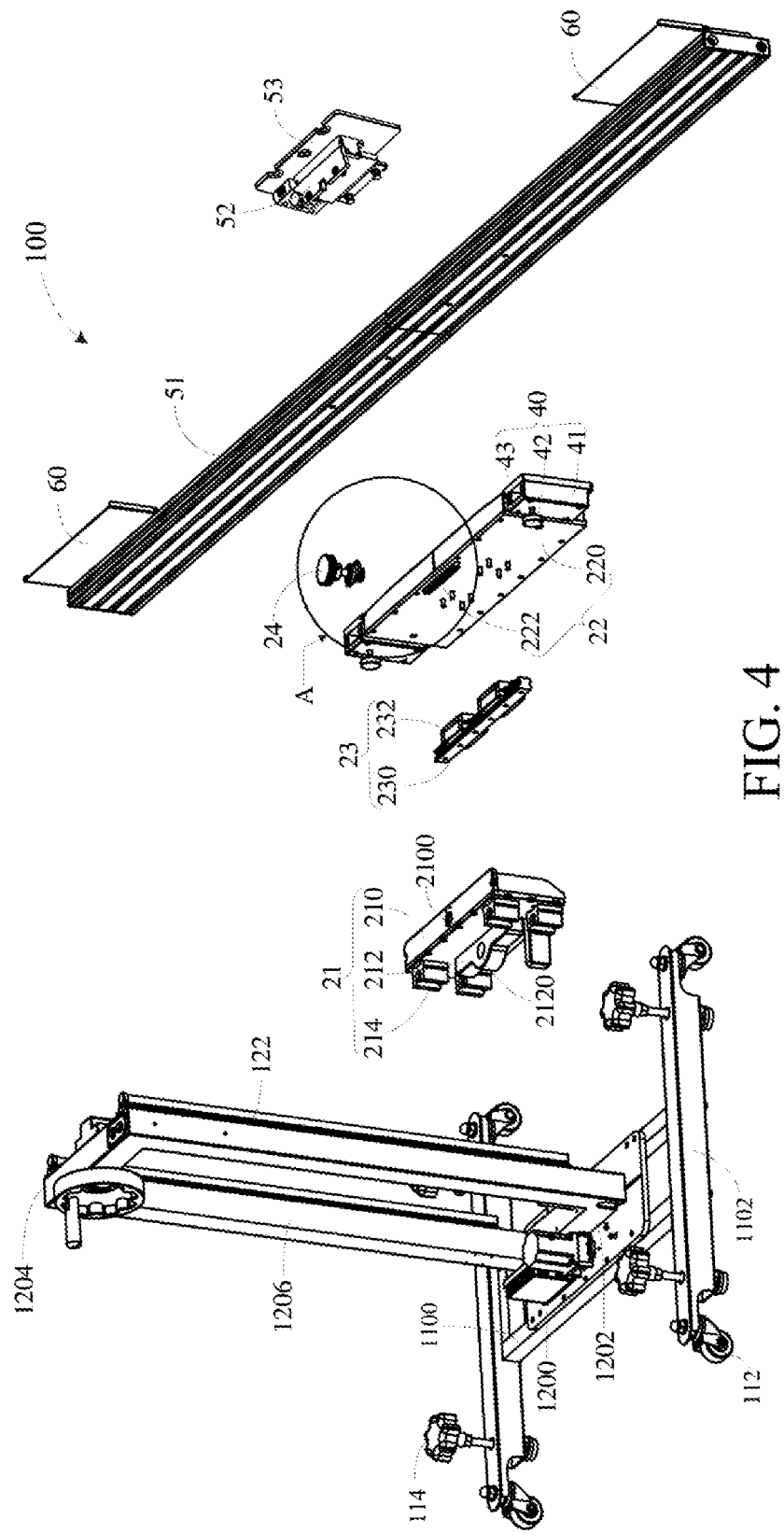
FIG. 4 is an exploded view of the automobile calibration device shown in FIG. 1 from another angle.
Figure 5:
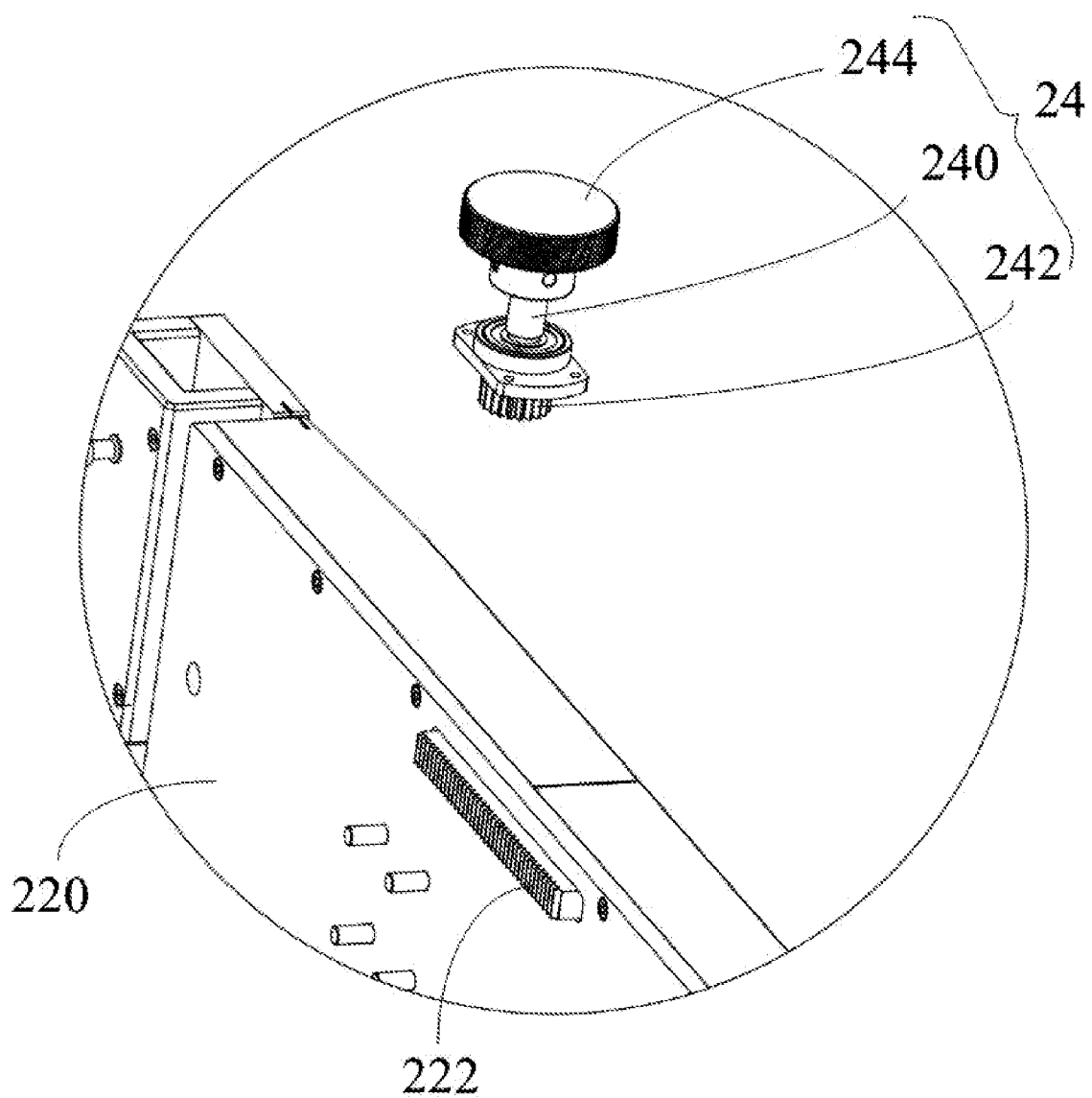
FIG. 5 is a partial enlarged view of a part A in FIG. 4.

Referring to FIG. 4 and FIG. 5 together, the slide member 21 includes a slide member body 210, a slide block 212 and a guide block 214. The slide member body 210 is approximately cubical. A mounting through hole 2100 is opened in the slide member body 210. The mounting through hole 2100 is configured to mount the adjustment member 24. The slide block 212 is fixedly mounted at the slide member body 210. A threaded through hole 2120 is opened in the slide block 212. The central axis of the threaded through hole 2120 is disposed vertically. The guide block 214 is fixedly mounted at the slide member body 210. The guide block 214 and the slide block 212 are located on a same side of the slide member body 210. There are four guide blocks 214. Two guide blocks 214 are located on one side of the slide block 212, are arranged in the vertical direction and are sleeved over one elevation guiderail 122. The other two guide blocks 214 are located on the other side of the slide block 212, are also arranged in the vertical direction and are sleeved over the other elevation guiderail 122. Every two guide blocks 214 are sleeved over one corresponding elevation guiderail 122 to enable the position adjustment apparatus 20 to stably slide along the elevation guiderail 122 in the vertical direction with respect to the elevation guiderail 122.

It may be understood that, in some other embodiments, the quantity of the guide blocks 214 may be changed according to an actual requirement, but is not limited to four, provided that there are at least one guide block 214. For example, there is one guide block 214, there is also one elevation guiderail 122 and the one guide block 214 is sleeved over the one elevation guiderail 122. For another example, there are two guide blocks 214, the two guide blocks 214 are respectively disposed at two opposite sides of the slide block 212, there are also two elevation guiderails 122 and each guide block 214 is sleeved over one corresponding elevation guiderail 122.

It may be understood that, in some other embodiments, the slide member 21 may be fixedly mounted on the vertical support body 120.

The supporting member 22 is movably mounted at the slide member body 210 and is horizontally movable with respect to the slide member body 210. Either the supporting member 22 or the slide member body 210 can include the first member, which is meshed with the second member of the adjustment member 24. The adjustment member can use the relative movement between the first member and the second member to move the supporting member 22 in a preset direction such as a horizontal direction. The adjustment member 24 can be manipulated by a user or an operator of the automobile calibration device 100. The implementations of the first member and the second member are not limited herein. For example, the first member can be a rack, correspondingly the second member can be a gear; or the first member can be a synchronous belt, correspondingly the second member can be a synchronous gear; or the first member can be a screw rod, correspondingly the second member can be a nut. The second member drives the first member to move, while enabling the supporting member 22 to move with respect to the slide member body 210.

For example, the supporting member 22 includes a supporting member body 220 and a rack 222. The supporting member body 220 is approximately cubical. The rack 222 is fixedly mounted at the supporting member body 220. The rack 222 is disposed between the supporting member body 220 and the slide member body 210 and is configured to fit with the adjustment member 24 to adjust the horizontal position of the supporting member 22. The rack 222 has a bar shape, is disposed in the horizontal direction and includes a plurality of gear teeth disposed in the vertical direction.

The connection assembly 23 includes a linear slide rail 230 and a slide rail fixing block 232. The linear slide rail 230 is disposed in the horizontal direction and is fixedly mounted at the slide member body 210. Two slide rail fixing blocks 232 are fixedly mounted at the supporting member body 220 and the two slide rail fixing blocks 232 are arranged in the horizontal direction. The two slide rail fixing blocks 232 are sleeved over the linear slide rail 230. The linear slide rail 230 is slidable in the horizontal direction with respect to the slide rail fixing block 232. In this way, the operator can adjust the relative position between the slide member 21 and the supporting member 22 roughly by sliding the supporting member 22 with respect to the slide member 21 via the linear slide rail 230. When the operator adjust the supporting member 22 to an approximate position, then the operator can use the adjustment member 24 to precisely determine the position of the support member 22, so as to precisely determine the position of the calibrator supported by the support member 22.

In this embodiment, the supporting member 22 is mounted at the slide member 21 via the connection assembly 23, so that the supporting member 22 is movably mounted at the slide member 21, that is, the supporting member 22 is movable with respect to the slide member 21. It may be understood that, in some other embodiments, the supporting member 22 may be movably mounted at the slide member 21 in another connection manner, provided that the supporting member 22 is movable in the horizontal direction with respect to the slide member 21. For example, a worm-gear mechanism or a belt-gear mechanism is used.

It may be understood that, in some other embodiments, the mounting positions of the linear slide rail 230 and the slide rail fixing block 232 are interchangeable. To be specific, the linear slide rail 230 is disposed in the horizontal direction and is fixedly mounted at the supporting member body 220. The two slide rail fixing blocks 232 are fixedly mounted at the slide member body 210. The two slide rail fixing blocks 232 are sleeved over the linear slide rail 230.

It may be understood that, in some other embodiments, the quantity of the slide rail fixing blocks 232 is not limited to two and may be changed according to an actual requirement, provided that there is at least one slide rail fixing block 232. For example, there is one slide rail fixing block 232.

According to the exemplary illustrations above, the adjustment member 24 includes a rod body 240, a second member such as a gear 242 and a knob portion 244. The rod body 240 passes through the mounting through hole 2100, the rod body 240 is movably mounted at the slide member body 210 and the rod body 240 is pivotable in the slide member body 210. The gear 242 and the knob portion 244 are respectively mounted at two ends of the rod body 240. The gear 242 is meshed with the rack 222. The knob portion 244 is located outside the slide member body 210 and is configured to assist a user in holding and rotating the adjustment member 24. When the knob portion 244 is rotated by an operator, the rod body 240 pivots in the slide member body 210, the gear 242 drives the rack 222 to move horizontally, to enable the supporting member 22 to move horizontally with respect to the slide member 21.

It may be understood that, in some other embodiments, the mounting positions of the adjustment member 24 and the rack 222 are interchangeable. To be specific, the adjustment member 24 may be mounted at the supporting member body 220. The rack 222 is fixedly mounted at the slide member body 210. The rack 222 is disposed in the horizontal direction.

In this embodiment, the linear slide rail 230 is disposed in the horizontal direction. The rack 222 has a bar shape, is disposed in the horizontal direction and includes a plurality of gear teeth disposed vertically. The gear 242 is a spur gear. These structures enable the supporting member 22 to move in the horizontal direction with respect to the slide member 21. It may be understood that, in some other embodiments, according to an actual requirement, the linear slide rail 230 may be disposed in a preset direction and the two slide rail fixing blocks 232 are arranged in the preset direction. The linear slide rail 230 is slidable in the preset direction with respect to the slide rail fixing blocks 232. The rack 222 has a bar shape and is disposed in the preset direction, so that when rotating, the gear 242 can drive the rack 222 to move in the preset direction, to enable the supporting member 22 to move in the preset direction with respect to the slide member 21.

It may also be understood that, the adjustment member 24 and the supporting member 22 can use other mesh-mechanisms to realize the relative movement between the supporting member 22 and the slide member 21. The mesh-mechanisms may include synchronous belt and gear, or screw rod and nut.

In this embodiment, the gear 242 is a spur gear and the rack 222 includes a plurality of gear teeth disposed in the vertical direction. By means of the gear engagement between the gear 242 and the rack 222, the supporting member 22 can stably and precisely move horizontally with respect to the slide member 21. It may be understood that, in some other embodiments, the gear 242 may be a helical gear and the rack 222 may include a plurality of slanted gear teeth. By means of the gear engagement between the gear 242 and the rack 222, the supporting member 22 can move horizontally with respect to the slide member 21.

Figure 6:
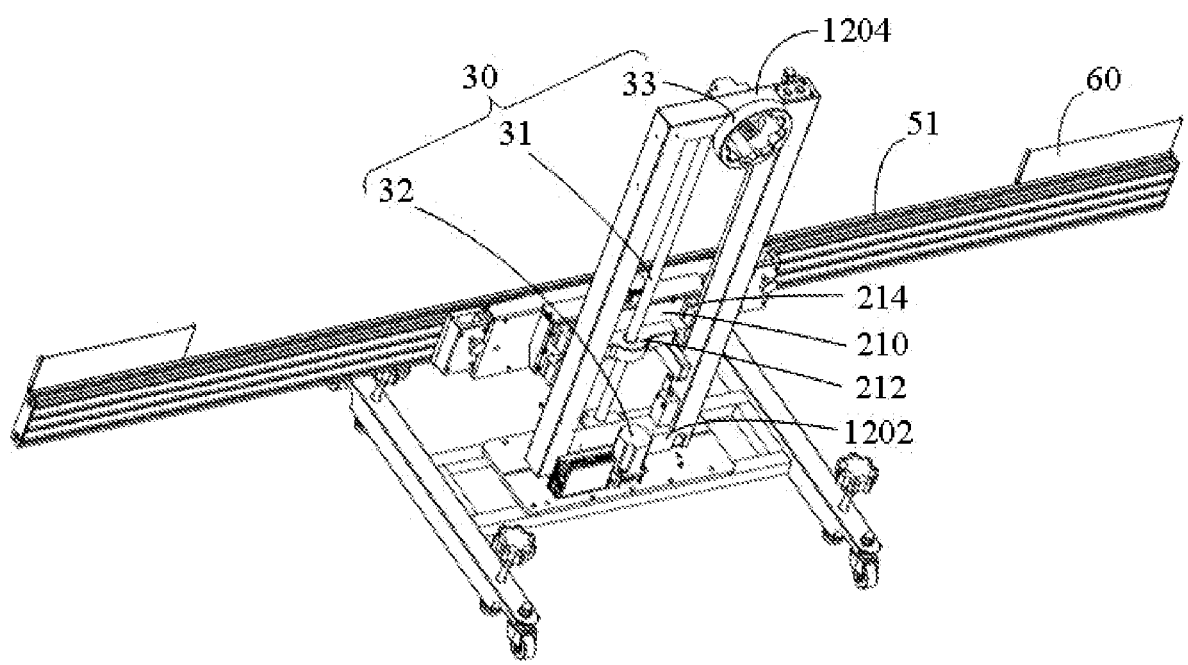
FIG. 6 is a schematic structural view of the automobile calibration device shown in FIG. 1, where a slide assembly and a hanging assembly of the automobile calibration device are omitted.

Referring to FIG. 6, the drive assembly 30 includes a transmission mechanism 31, a first drive mechanism 32 and a second drive mechanism 33. The first drive mechanism 32 and the second drive mechanism 33 are both connected to the transmission mechanism 31. The first drive mechanism 32 is configured to drive the transmission mechanism 31 to move. The second drive mechanism 33 is also configured to drive the transmission mechanism 31 to move. The transmission mechanism 31 is configured to enable the position adjustment apparatus 20 to move in the vertical direction with respect to the support apparatus 10.

Figure 7:
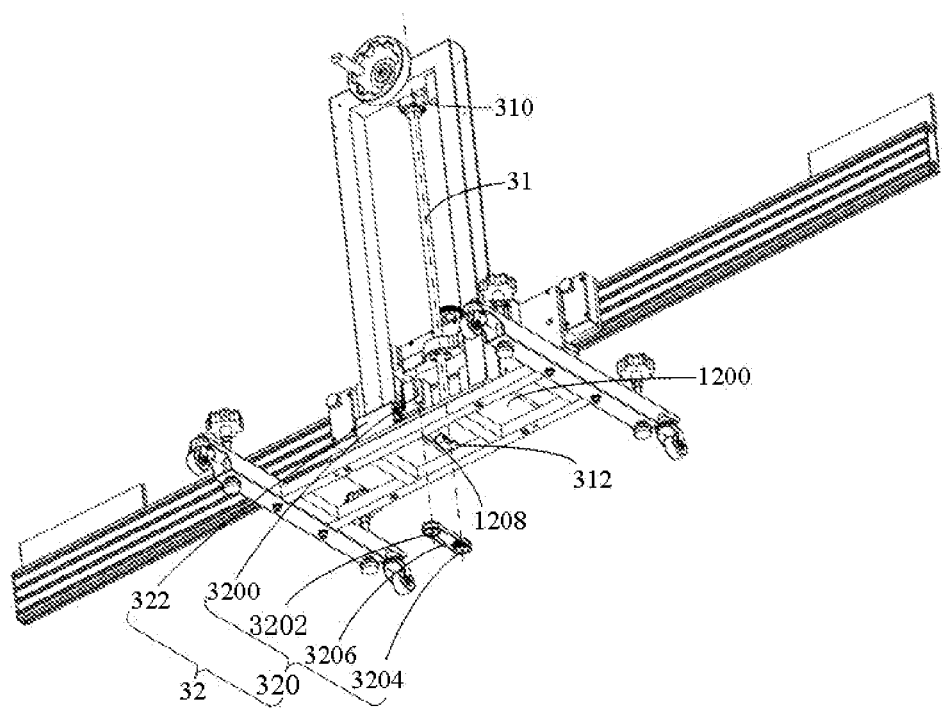
FIG. 7 is a schematic structural view of the automobile calibration device shown in FIG. 1 from another angle, where a slide assembly and a hanging assembly of the automobile calibration device are omitted.
Figure 8:
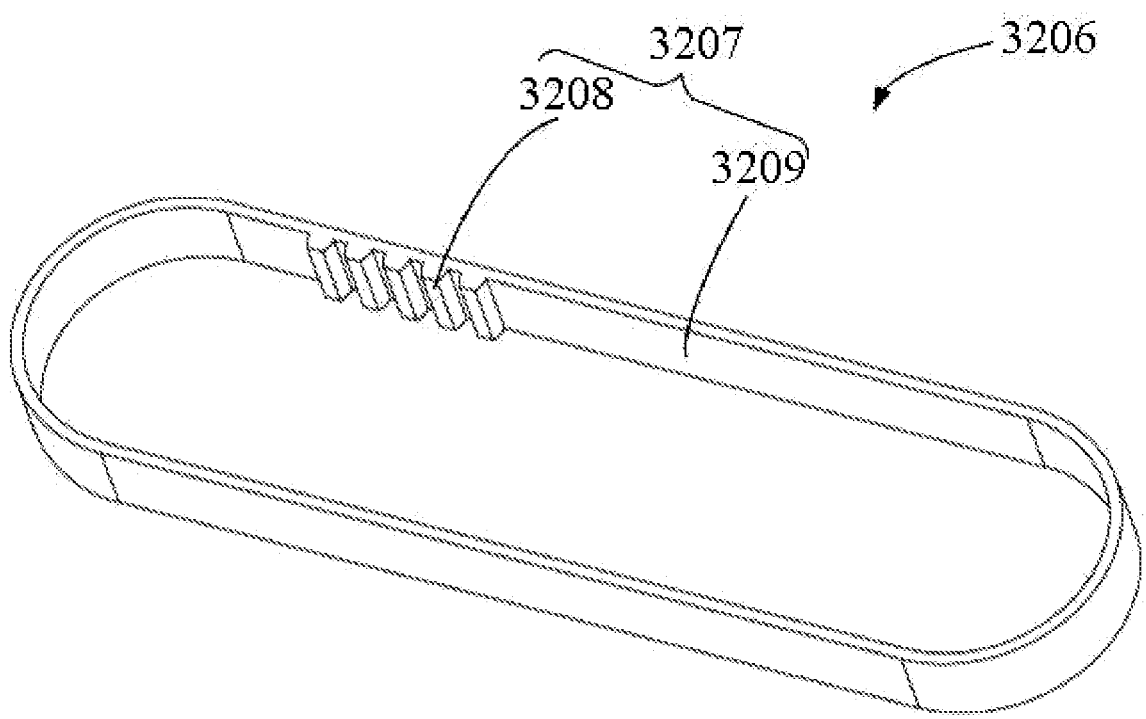
FIG. 8 is a schematic structural view of a drive belt of a motor assembly of the automobile calibration device shown in FIG. 7.

Referring to FIG. 7 and FIG. 8 together, in this embodiment, the transmission mechanism 31 is an elevation screw rod 31. A first shaft seat 310 and a second shaft seat 312 are respectively disposed at two ends of the elevation screw rod 31. The first shaft seat 310 is fixedly mounted at the top beam 1204. The second shaft seat 312 is fixedly mounted at the mounting groove body 1202. The elevation screw rod 31 is disposed vertically. The elevation screw rod 31 is rotatable around the central axis of the elevation screw rod 31. The elevation screw rod 31 passes through the threaded through hole 2120. The elevation screw rod 31 is threaded to the threaded through hole 2120. When the elevation screw rod 31 rotates around the central axis of the elevation screw rod 31, the elevation screw rod 31 can drive the slide block 212 to ascend or descend, to enable the position adjustment apparatus 20, the clamping apparatus 40, the slide apparatus 50 and the scale apparatus 60 to ascend or descend. It should be noted that the elevation screw rod 31 is threaded to the threaded through hole 2120, so that in one aspect, the position adjustment apparatus 20 ascends or descends smoothly and stably and in another aspect, because the position adjustment apparatus 20 has a particular mass, the elevation screw rod 31 and the threaded through hole 2120 implement a self-locking function to automatically prevent the position adjustment apparatus 20 from sliding downwards.

It may be understood that, according to an actual case, a transmission mechanism 31 is not only limited to the elevation screw rod 31. In some other embodiments, the transmission mechanism 31 may be alternatively a gear set, a belt-gear mechanism, a worm-gear mechanism, a chain-gear mechanism or the like.

It may be understood that, the slide member 21 and the connection assembly 23 for bearing the supporting member 22 may be omitted. That is, the slide block 212 and the guide block 214 may be mounted at the supporting member 22, so that the supporting member 22 is directly mounted at the elevation screw rod 31 and the elevation guiderail 122 and the supporting member 21 is mounted at the support apparatus 10 and is movable in the vertical direction with respect to the support apparatus 10. A trigger apparatus 3229 below may also be directly mounted at the supporting member 21. The trigger apparatus 3229 can trigger a limit switch 3225 below when the supporting member 21 moves in the vertical direction.

The first drive mechanism 32 is an electrical drive mechanism and is configured to drive the elevation screw rod 31 to rotate around the central axis of the elevation screw rod 31. The first drive mechanism 32 includes a motor assembly 320, a control assembly 322 and a power supply assembly (not shown). The motor assembly 320 is configured to drive the elevation screw rod 31 to rotate around the central axis of the elevation screw rod 31. The control assembly 322 is configured to control the motor assembly 320 to drive the elevation screw rod 31 to rotate around the central axis of the elevation screw rod 31. The power supply assembly is configured to supply power to the motor assembly 320 and the control assembly 322.

The motor assembly 320 includes a motor 3200, a first synchronous gear 3202, a second synchronous gear 3204 and a drive belt 3206. The motor 3200 is fixedly mounted at the upper surface of the mounting plate 1200. The motor 3200 is a step motor. It may be understood that, in some other embodiments, the motor 3200 may be another control motor, for example, a servo motor. The first synchronous gear 3202 is located in the maintenance opening 1208. The first synchronous gear 3202 is fixedly mounted at a rotating shaft of the motor 3200 and the first synchronous gear 3202 and the rotating shaft of the motor 3200 are disposed coaxially. An end of the elevation screw rod 31 passes through the second shaft seat 312 and the maintenance opening 1208. The second synchronous gear 3204 is located in the maintenance opening 1208. The second synchronous gear 3204 is fixedly mounted at the elevation screw rod 31. The second synchronous gear 3204 and the elevation screw rod 31 are disposed coaxially. The first synchronous gear 3202 and the second synchronous gear 3204 are disposed at a preset distance from each other. When the motor 3200 rotates, the first synchronous gear 3202 drives the second synchronous gear 3204 through the drive belt 3206 to rotate, to enable the elevation screw rod 31 to rotate around the central axis of the elevation screw rod 31. When the motor 3200 rotates in a first rotational direction, the position adjustment apparatus 20 ascends in the vertical direction with respect to the support apparatus 10. When the motor 3200 rotates in a second rotational direction, the position adjustment apparatus 20 descends in the vertical direction with respect to the support apparatus 10. The first rotational direction and the second rotational direction are opposite.

The drive belt 3206 is sleeved over the first synchronous gear 3202 and the second synchronous gear 3204. When the first synchronous gear 3202 rotates, the first synchronous gear 3202 drives the second synchronous gear 3204 through the drive belt 3206 to rotate. A peripheral surface of the first synchronous gear 3202 and a peripheral surface of the second synchronous gear 3204 are both provided with gear teeth. The drive belt 3206 includes an assembly surface 3207. The gear teeth of the first synchronous gear 3202 and the gear teeth of the second synchronous gear 3204 are both in contact with the assembly surface 3207. The assembly surface 3207 includes a toothed area 3208 and a non-toothed area 3209. The toothed area 3208 is provided with gear teeth. The toothed area 3208 may be meshed with the first synchronous gear 3202 and the second synchronous gear 3204. The non-toothed area 3209 may be in contact with the first synchronous gear 3202 and the second synchronous gear 3204. When the motor 3200 rotates and the toothed area 3208 is meshed with the first synchronous gear 3202 or the toothed area 3208 is meshed with the second synchronous gear 3204, the first synchronous gear 3202 and the second synchronous gear 3204 move synchronously and a rate of the second synchronous gear 3202 is a first preset rate value. When the motor 3200 rotates and the first synchronous gear 3202 and the second synchronous gear 3204 are only in contact with the non-toothed area 3209, due to skidding or the like of the non-toothed area 3209, the first synchronous gear 3202 and the second synchronous gear 3204 move asynchronously and a rate of the second synchronous gear 3202 is a second preset rate value. The first preset rate value is greater than the second preset rate value. It should be noted that, the assembly surface 3207 is divided into the toothed area 3208 and the non-toothed area 3209, so that while the rate of the first synchronous gear 3202 is kept unchanged, the rate of the second synchronous gear 3204 is controlled, thereby achieving rate reduction.

Figure 9:
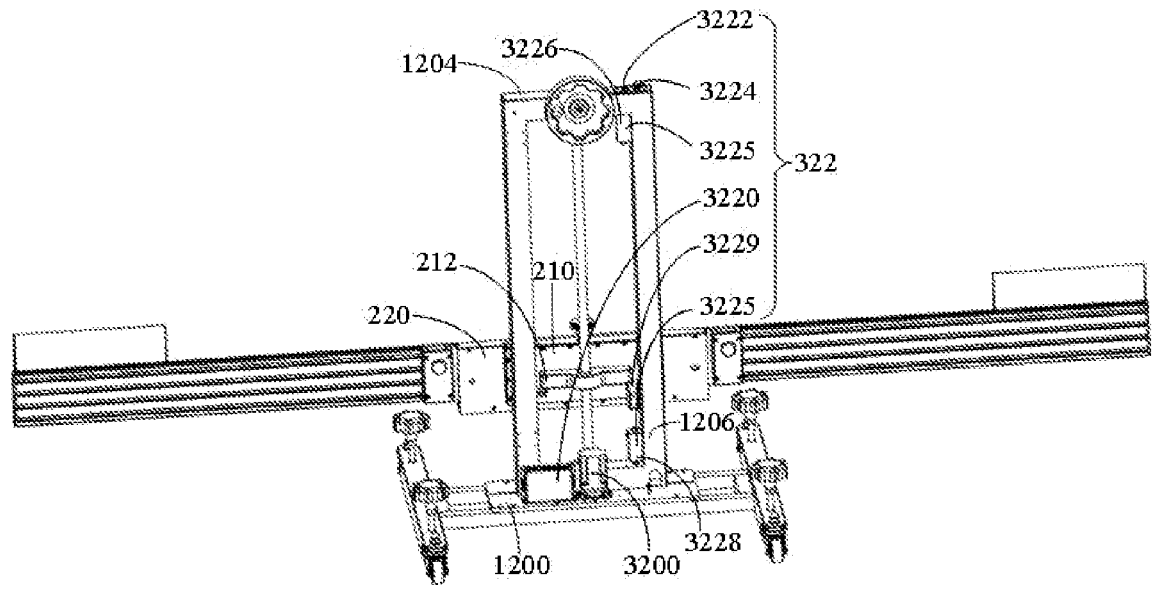
FIG. 9 is a schematic structural view of still another angle of the automobile calibration device shown in FIG. 1, where a slide assembly and a hanging assembly of the automobile calibration device are omitted.

Referring to FIG. 9, the control assembly 322 includes a controller 3220, an ascending button 3222, a descending button 3224, the limit switch 3225 and the trigger apparatus 3229. The controller 3220 is electrically connected to the ascending button 3222, the descending button 3224 and the limit switch 3225. The controller 3220 is configured to control the motor 3200. The ascending button 3222, the descending button 3224 and the limit switch 3225 are all configured to control the controller 3220. The trigger apparatus 3229 is configured to trigger the limit switch 3225.

The trigger apparatus 3229 has a plate-form structure. The trigger apparatus 3229 is mounted at the slide member body 210 and the trigger apparatus 3229 and the slide block 212 are located on a same side of the slide member body 210. The limit switch 3225 is mounted at the vertical beam 1206 and the limit switch 3225 is located above or below the trigger apparatus 3229. The ascending button 3222 and the descending button 3224 are both mounted at the top beam 1204. The controller 3220 is mounted at the upper surface of the mounting plate 1200. The ascending button 3222, the descending button 3224 and the limit switch 3225 are all electrically connected to the controller 3220 through a wire bundle (not shown). The wire bundle is disposed in the wiring groove structure and passes through the wiring opening to be connected to the controller 3220.

The controller 3220 includes a drive (not shown) and an elevation control panel (not shown). The elevation control panel is connected to the drive. The drive is connected to the motor 3200. The drive is configured to control the motor 3200, for example, control the start/stop, the rotational speed, the rotational direction and the like of the motor 3200. The ascending button 3222, the descending button 3224, an ascending limit switch 3226 and a descending limit switch 3228 are all electrically connected to the elevation control panel. The ascending button 3222, the descending button 3224, the ascending limit switch 3226 and the descending limit switch 3228 are all configured to control the elevation control panel.

When the ascending button 3222 is triggered, the controller 3220 is configured to control the motor 3200 to rotate along the first rotational direction. When the lowering button 3224 is triggered, the controller 3220 is configured to control the motor 3200 to rotate in the second rotational direction. When the ascending button 3222 and the descending button 3224 are triggered simultaneously, the controller 3220 is configured to control the motor 3200 to stop rotation. It should be noted that, because the ascending button 3222 and the descending button 3224 need to be disposed together to facilitate operation and a misoperation is likely to occur. When the ascending button 3222 and the descending button 3224 are triggered simultaneously, the controller 3220 is configured to control the motor 3200 to stop rotation to protect the motor 3200 from damage caused by short circuiting.

When the limit switch 3225 is triggered, the controller 3220 is configured to control the motor 3200 to stop rotation and the motor 3200 is controlled to rotate in only the preset direction, so that the trigger apparatus 3229 is far away from the limit switch 3225.

It may be understood that, there may be one or two limit switches 3225. In this embodiment, the limit switch 3225 includes the ascending limit switch 3226 and the descending limit switch 3228. The ascending limit switch 3226 and the descending limit switch 3228 are mounted on a same side of one vertical beam 1206. The ascending limit switch 3226 is located above the trigger apparatus 3229 and the descending limit switch 3228 is located below the trigger apparatus 3229.

When the ascending limit switch 3226 is triggered, the controller 3220 is configured to control the motor 3200 to stop rotation and control the motor 3200 to rotate in only the second rotational direction. When the descending limit switch 3228 is triggered, the controller 3220 is configured to control the motor 3200 to stop rotation and control the motor to rotate in only the first rotational direction. It should be noted that, the ascending limit switch 3226 and the descending limit switch 3228 are disposed, so that the position adjustment apparatus 20 is automatically prevented from exceeding a maximum travel without manual intervention and the motor 3200 is set to rotate in a specified direction, so that the motor 3200 is protected from damage caused by short circuiting during a misoperation.

At the instant the motor 3200 starts to rotate, the controller 3220 is further configured to control the rate of the motor 3200 to increase linearly or non-linearly from 0 to a preset value.

The power supply assembly includes a DC socket, a power switch and a power indicator lamp. When a power adapter is plugged in the DC socket and the power switch is turned on, the power indicator lamp emits preset light such as red light and the controller 3220 and the motor 3200 may work.

Figure 10:
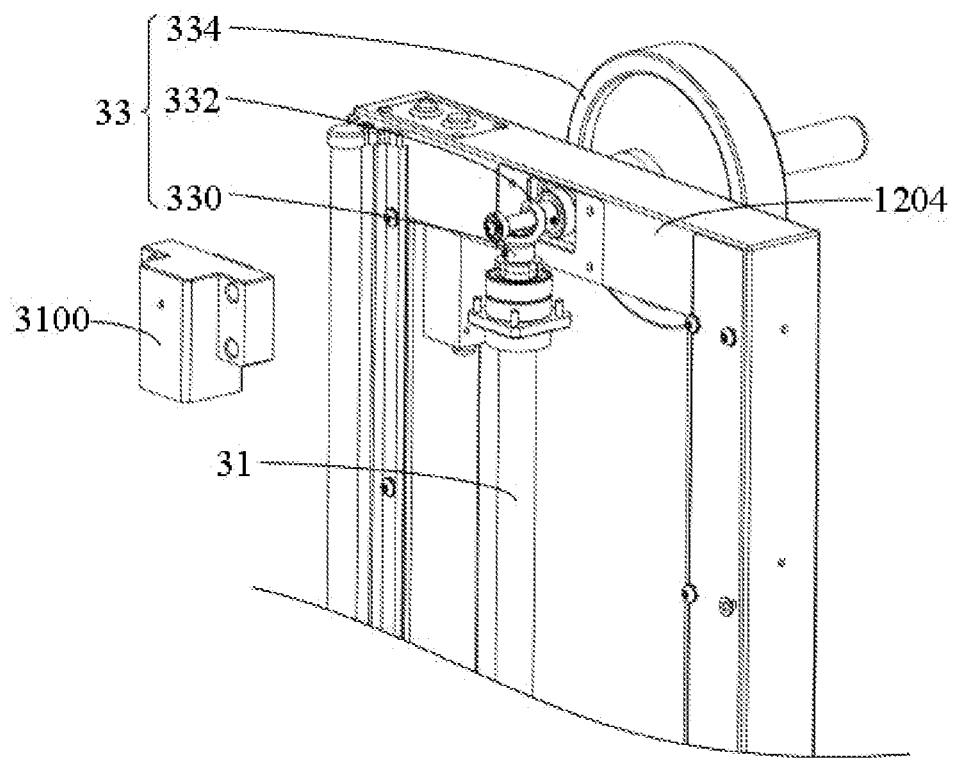
FIG. 10 is a partial schematic exploded view of the automobile calibration device shown in FIG. 1, where a first shaft seat is detached.

Referring to FIG. 10, the second drive mechanism 33 is a manual drive mechanism. The second drive mechanism 33 includes a first helical gear 330, a second helical gear 332 and an elevation handwheel 334. A connection rod (not shown) of the elevation handwheel 334 passes through the top beam 1204 and is accommodated in the first shaft seat 3100. The first helical gear 330 and the second helical gear 332 are both located in the first shaft seat 3100. The first helical gear 330 is fixedly mounted at the elevation screw rod 31. The first helical gear 330 and the elevation screw rod 31 are disposed coaxially. The second helical gear 332 is fixedly mounted at the connection rod of the elevation handwheel 334 and the second helical gear 332 and the connection rod of the elevation handwheel 334 are disposed coaxially. The first helical gear 330 is meshed with the second helical gear 332. The rotational axis of the elevation handwheel 334 is disposed horizontally. It should be noted that, the second drive mechanism 33 is disposed, so that in one aspect, when there is a power supply shortage, the automobile calibration device 100 can be used normally and in another aspect, the first drive mechanism 32 and the second drive mechanism 33 share one transmission mechanism 31 and the overall structure is compact. It may be understood that, in some other embodiments, an angle between the rotational axis of the elevation handwheel 334 and the horizontal plane may be set to any value according to an actual case.

In this embodiment, the drive assembly 30 is disposed in the automobile calibration device 100, so that the position adjustment apparatus 20, the clamping apparatus 40, the slide apparatus 50 and the scale apparatus 60 can automatically ascend or descend, thereby avoiding manual adjustment.

In addition, a transmission mechanism 31 is disposed to be the elevation screw rod 31 to fit with the threaded through hole 2120, so that the position adjustment apparatus 20 ascends or descends smoothly and the position adjustment apparatus 20 is prevented from sliding downwards easily.

Moreover, the first drive mechanism 32 and the second drive mechanism 33 are disposed, so that the automobile calibration device 100 can be used when there is a power supply shortage, thereby improving the applicability of the automobile calibration device 100. In addition, the first drive mechanism 32 and the second drive mechanism 33 share the same transmission mechanism 31, thereby improving the overall compactness of the automobile calibration device 100.

Finally, the assembly surface 3207 is divided into the toothed area 3208 and the non-toothed area 3209 and the rate of the second synchronous gear 3204 is controlled, thereby achieving rate reduction.

Figure 11:
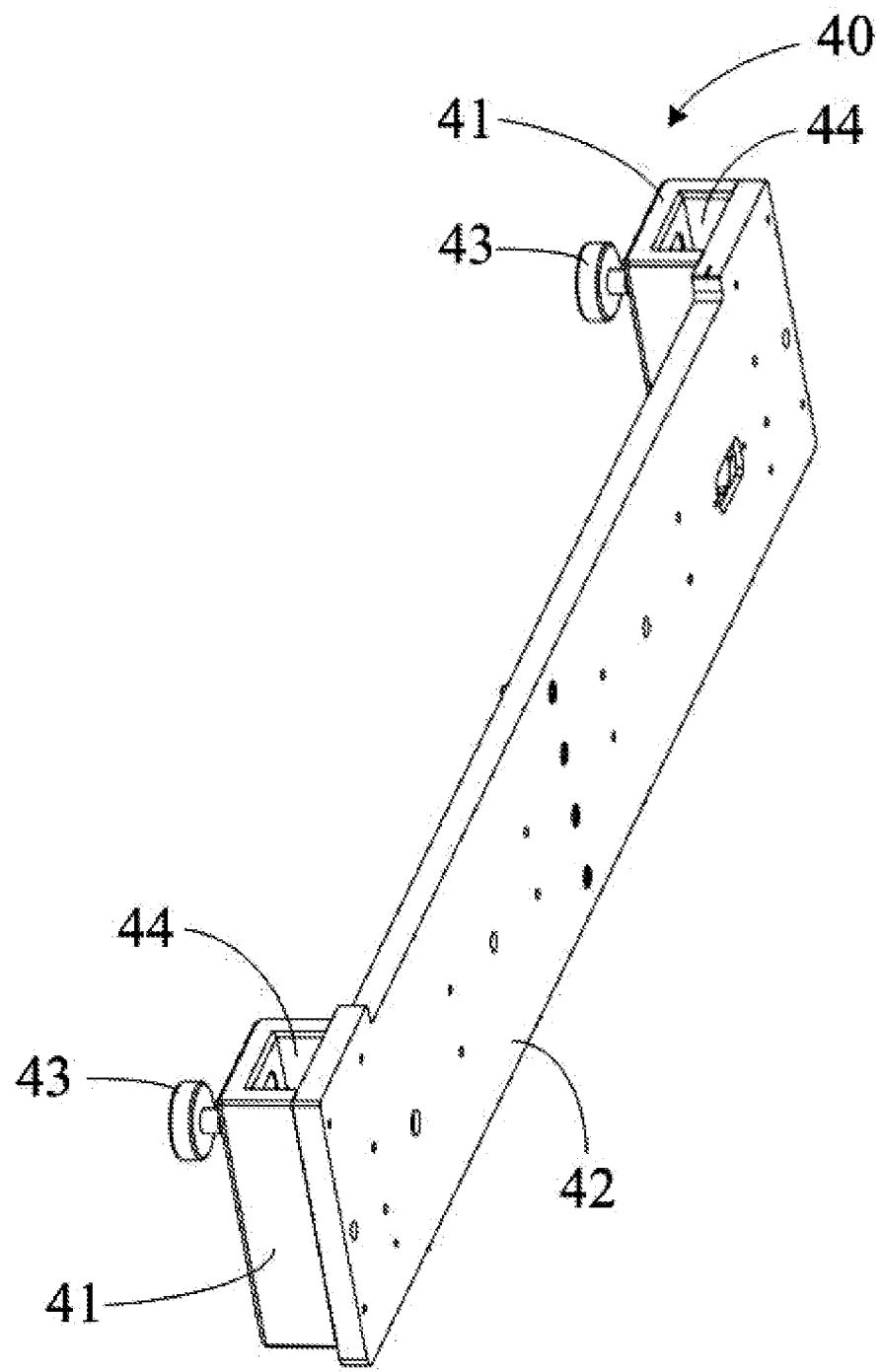
FIG. 11 is a schematic structural view of a clamping apparatus of the automobile calibration device shown in FIG. 1.
Figure 12:
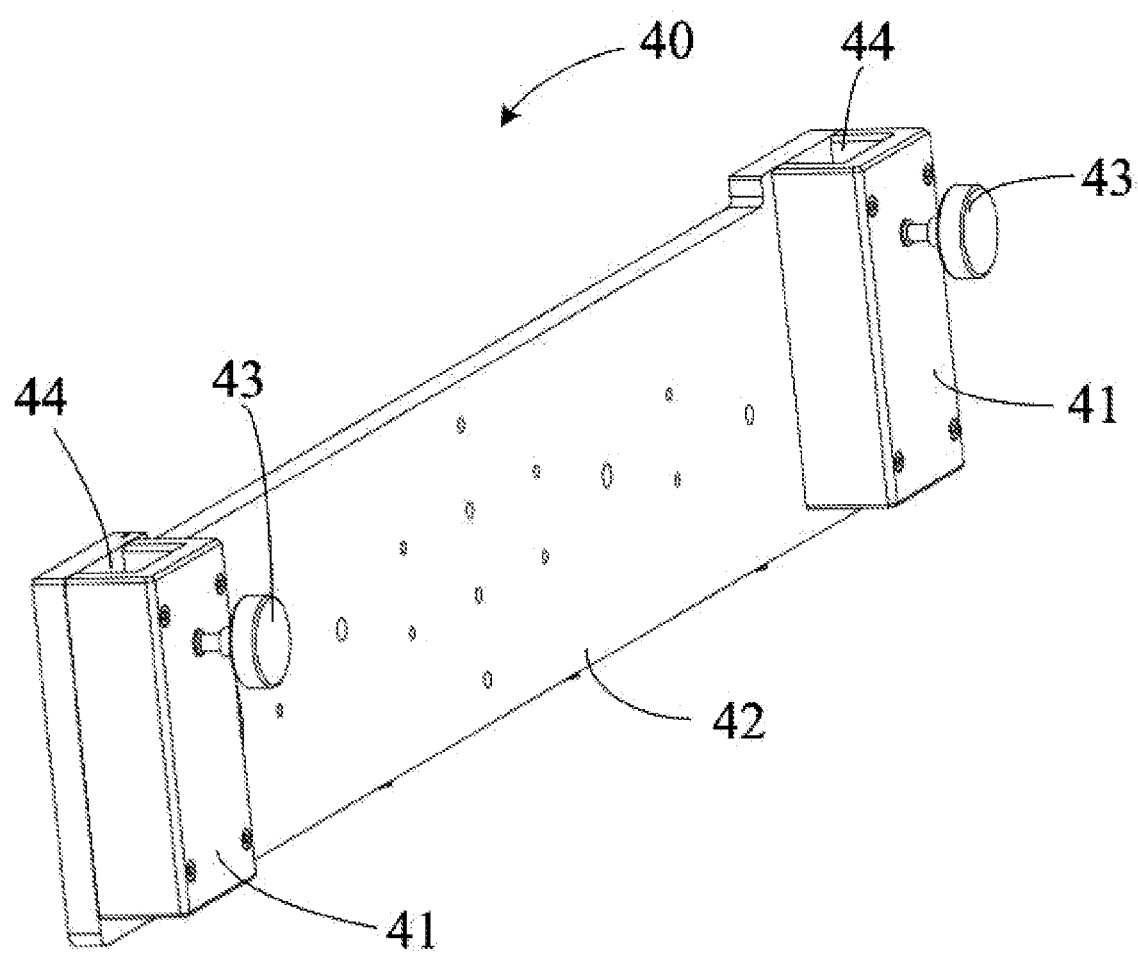
FIG. 12 is a schematic structural view of the clamping apparatus shown in FIG. 11 from another angle.

Referring to FIG. 11 and FIG. 12 together, the clamping apparatus 40 includes a fixing block 41, a fixing plate 42 and a tightening knob 43. The fixing block 41 is fixedly mounted at the fixing plate 42. The fixing block 41 and the fixing plate 42 enclose an accommodating cavity 44. The accommodating cavity 44 is configured to accommodate a fixing rod of a calibration apparatus. The tightening knob 43 is mounted at the fixing block 41 and the tightening knob 43 is rotatable with respect to the fixing block 41 to extend into the accommodating cavity 44 to abut the fixing rod of the calibration apparatus inserted in the accommodating cavity 44.

Figure 13:
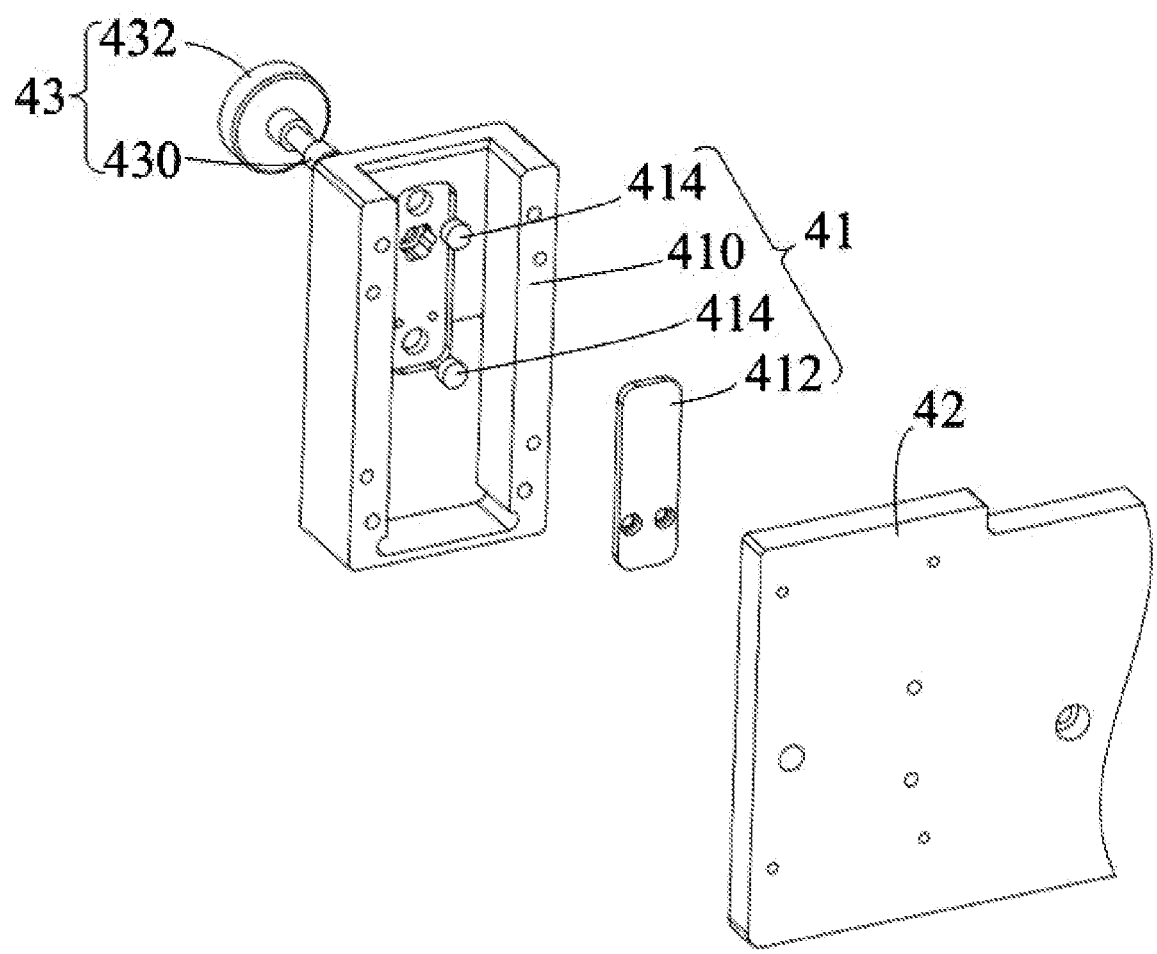
FIG. 13 is an exploded view of the clamping apparatus shown in FIG. 11.

Referring to FIG. 13, the fixing block 41 includes a fixing block body 410, a locking elastic sheet 412 and a magnetic component 414. The fixing block body 410 is fixedly mounted at the fixing plate 42 and the fixing block body 410 and the fixing plate 42 enclose the accommodating cavity 44. The locking elastic sheet 412 is located in the accommodating cavity 44 and is pushed by the tightening knob 43 to abut the fixing rod of the calibration apparatus. The magnetic component 414 is fixedly mounted at the fixing block body 410 and the magnetic component 414 is located in the accommodating cavity 44. The magnetic component 414 is configured to attract the locking elastic sheet 412, to enable the locking elastic sheet 412 to leave the fixing rod of the calibration apparatus. In this embodiment, there are two magnetic components 414. The two magnetic components 414 are arranged in the vertical direction and the two magnetic components 414 are respectively located at two opposite ends of the locking elastic sheet 412, so that the locking elastic sheet 412 is forcefully and stably attracted. It may be understood that, in some other embodiments, the quantity of the magnetic components 414 may be changed according to an actual requirement, provided that there is at least one magnetic component 414.

Figure 14:
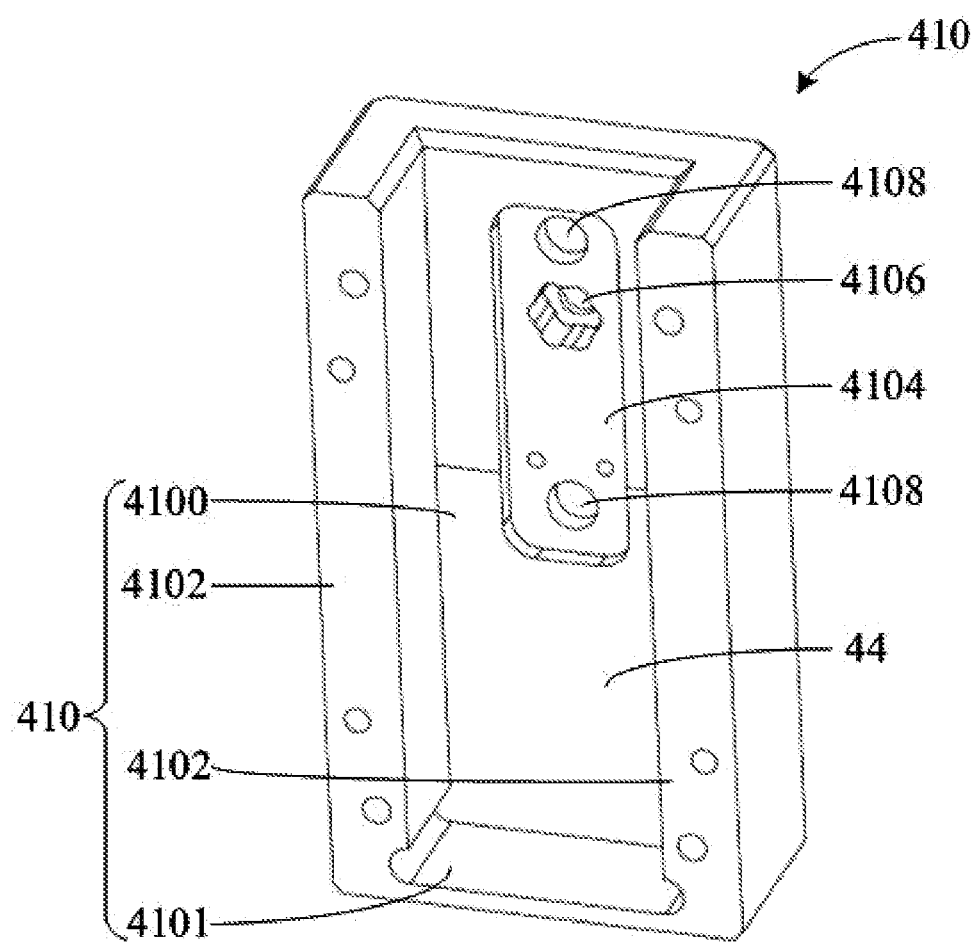
FIG. 14 is a schematic structural view of a fixing block body of the clamping apparatus shown in FIG. 11.
Figure 15:
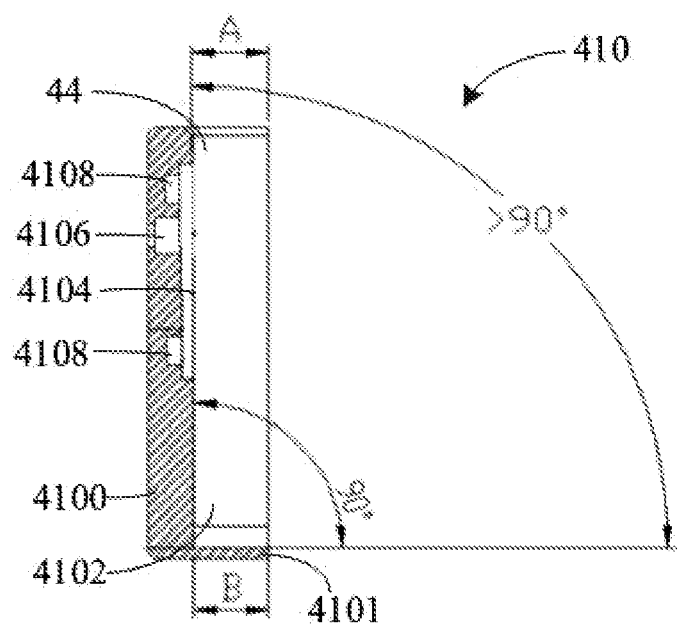
FIG. 15 is a sectional view of the fixing block body shown in FIG. 14.

Referring to FIG. 14 and FIG. 15 together, the fixing block body 410 includes a side wall 4100, a bottom wall 4101 and a connecting wall 4102. The bottom wall 4101 is connected to the side wall 4100 and the connecting wall 4102. There are two connecting walls 4102. The two connecting walls 4102 are connected to two opposite sides of the side wall 4100. Similarly, the two connecting walls 4102 are connected to two opposite sides of the bottom wall 4101. The two connecting walls 4102 and the bottom wall 4101 are fixedly mounted at the fixing plate 42. The side wall 4100, the bottom wall 4101, the connecting wall 4102 and the fixing plate 42 together enclose the accommodating cavity 44.

The side wall 4100 is provided with a concave groove 4104. The concave groove 4104 is configured to accommodate the locking elastic sheet 412. A threaded fixing through hole 4106 and an accommodating groove 4108 are provided in an inner wall of the concave groove 4104. The fixing through hole 4106 is a threaded hole and is configured to fit with the tightening knob 43. The accommodating groove 4108 is a blind hole. There are two accommodating grooves 4108 configured to accommodate the magnetic component 414. The two accommodating grooves 4108 are arranged in the vertical direction and the two accommodating grooves 4108 are respectively located on two sides of the fixing through hole 4106.

One side, near the bottom wall 4101, of the side wall 4100 is perpendicularly connected to the bottom wall 4101. The other side, away from the bottom wall 4101, of the side wall 4100, tilts in a direction away from the accommodating cavity 44, so that an obtuse angle is formed between the other side, away from the bottom wall 4101, of the side wall 4100 and the bottom wall 4101. A width B of one side, near the bottom wall 4101, of the connecting wall 4102 is less than a width A of the other side, away from the bottom wall 4101, of the connecting wall 4102. That is, the width of the bottom portion of the accommodating cavity 44 is smaller than the width of the mouth portion of the accommodating cavity 44, so that the fixing rod of the calibration apparatus is easily inserted in the accommodating cavity 44 and when the fixing rod of the calibration apparatus is inserted in the bottom portion of the accommodating cavity 44, the fixing rod of the calibration apparatus is securely fixed in the accommodating cavity 44.

Referring to FIG. 13 again, the fixing plate 42 is a rectangular plate and may be made of a material with relatively high strength, for example, a stainless steel material.

The tightening knob 43 includes a push rod 430 and a knob portion 432. The push rod 430 has an external thread and passes through the fixing through hole 4106, so that one end of the push rod 430 extends into the accommodating cavity 44. The push rod 430 is threaded to the fixing through hole 4106. The knob portion 432 is cylindrical, is fixedly mounted at the other end of the push rod 430 and is configured to assist a user in holding and rotating the tightening knob 43.

In this embodiment, there are two fixing blocks 41 and two tightening knobs 43. The two fixing blocks 41 are respectively fixedly mounted at the fixing plate 42 and the two fixing blocks 41 are located on a same side of the fixing plate 42. The two fixing blocks 41 are arranged in the horizontal direction.

Figure 16:
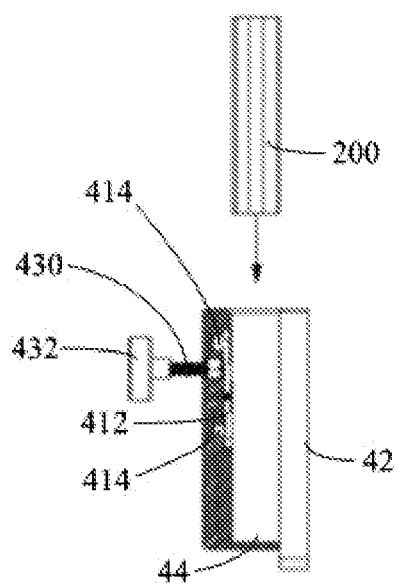
FIG. 16 is a diagram showing a use state of the clamping apparatus shown in FIG. 11, where a fixing rod is located outside the clamping apparatus.

Referring to FIG. 16, when the knob portion 432 rotates counterclockwise, the push rod 430 moves in a direction away from the locking elastic sheet 412. The push rod 430 and the locking elastic sheet 412 do not contact. In this case, the magnetic component 414 attracts the locking elastic sheet 412 in a direction away from the fixing plate 42, so that the size of the mouth portion of the accommodating cavity 44 increases to facilitate the insertion of a fixing rod 200.

Figure 17:
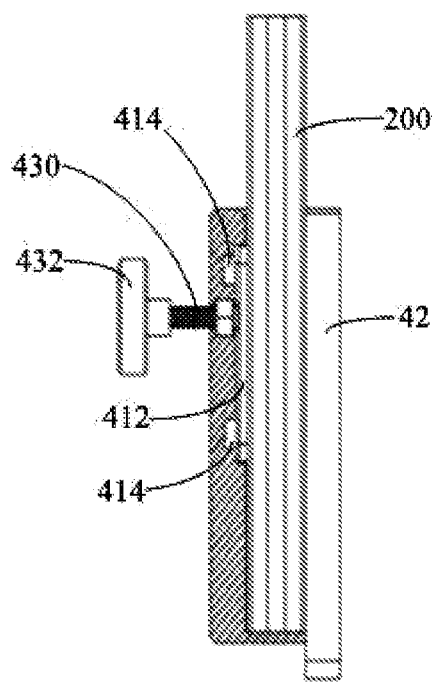
FIG. 17 is a diagram showing a use state of the clamping apparatus shown in FIG. 11, where a fixing rod is inserted in the clamping apparatus.

Referring to FIG. 17, when the fixing rod 200 is inserted in the bottom portion of the accommodating cavity 44, the knob portion 432 rotates clockwise, the push rod 430 comes into contact with the locking elastic sheet 412 to push the locking elastic sheet 412 to abut the fixing rod 200, so as to clamp the fixing rod 200 in the accommodating cavity 44.

In this embodiment, the tightening knob 43 pushes the locking elastic sheet 412 to abut an apparatus that needs to be clamped, for example, the fixing rod 200. Because the locking elastic sheet 412 is in surface contact with the apparatus that needs to be clamped, a frictional force between the locking elastic sheet 412 and the apparatus that needs to be clamped is increased, to enable the locking elastic sheet 412 to securely abut the apparatus that needs to be clamped. The locking elastic sheet 412 and the apparatus that needs to be clamped require lower assembly precision and it is convenient to rapidly assemble the apparatus that needs to be clamped at the clamping apparatus 40. In addition, the magnetic component 414 is configured to attract the locking elastic sheet 412 in the direction away from the fixing plate 42, so that the size of the mouth portion of the accommodating cavity 44 can be conveniently increased to facilitate the insertion of the apparatus that needs to be clamped.

Figure 18:
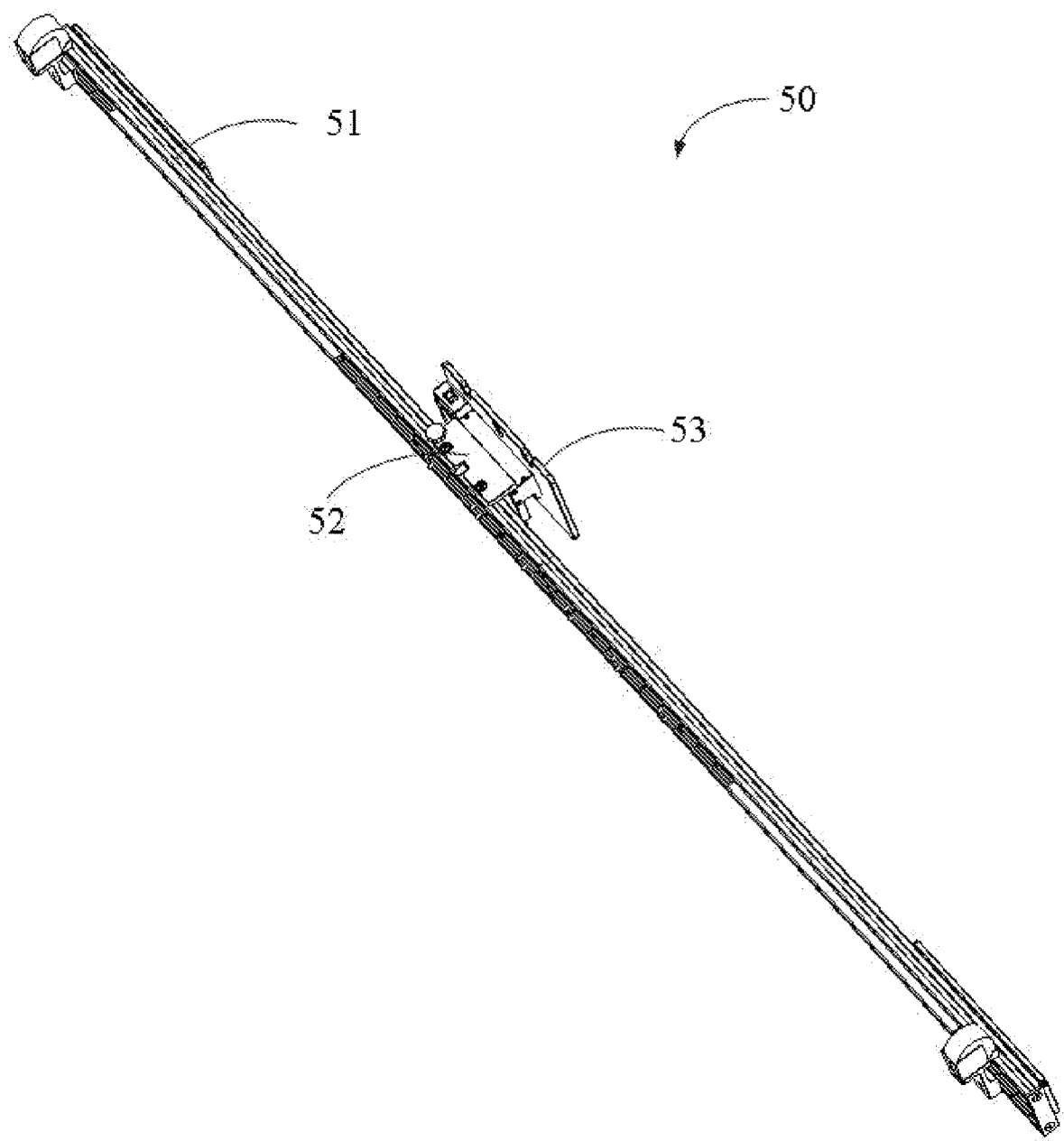
FIG. 18 is a schematic structural view of a slide apparatus of the automobile calibration device shown in FIG. 1.
Figure 19:
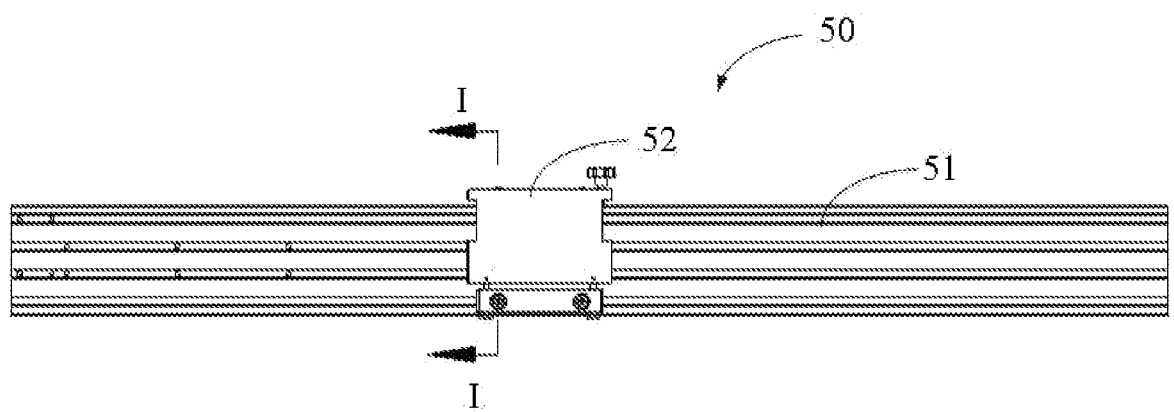
FIG. 19 is a front view of the slide apparatus shown in FIG. 18, where a hanging assembly of the slide apparatus is omitted.
Figure 20:
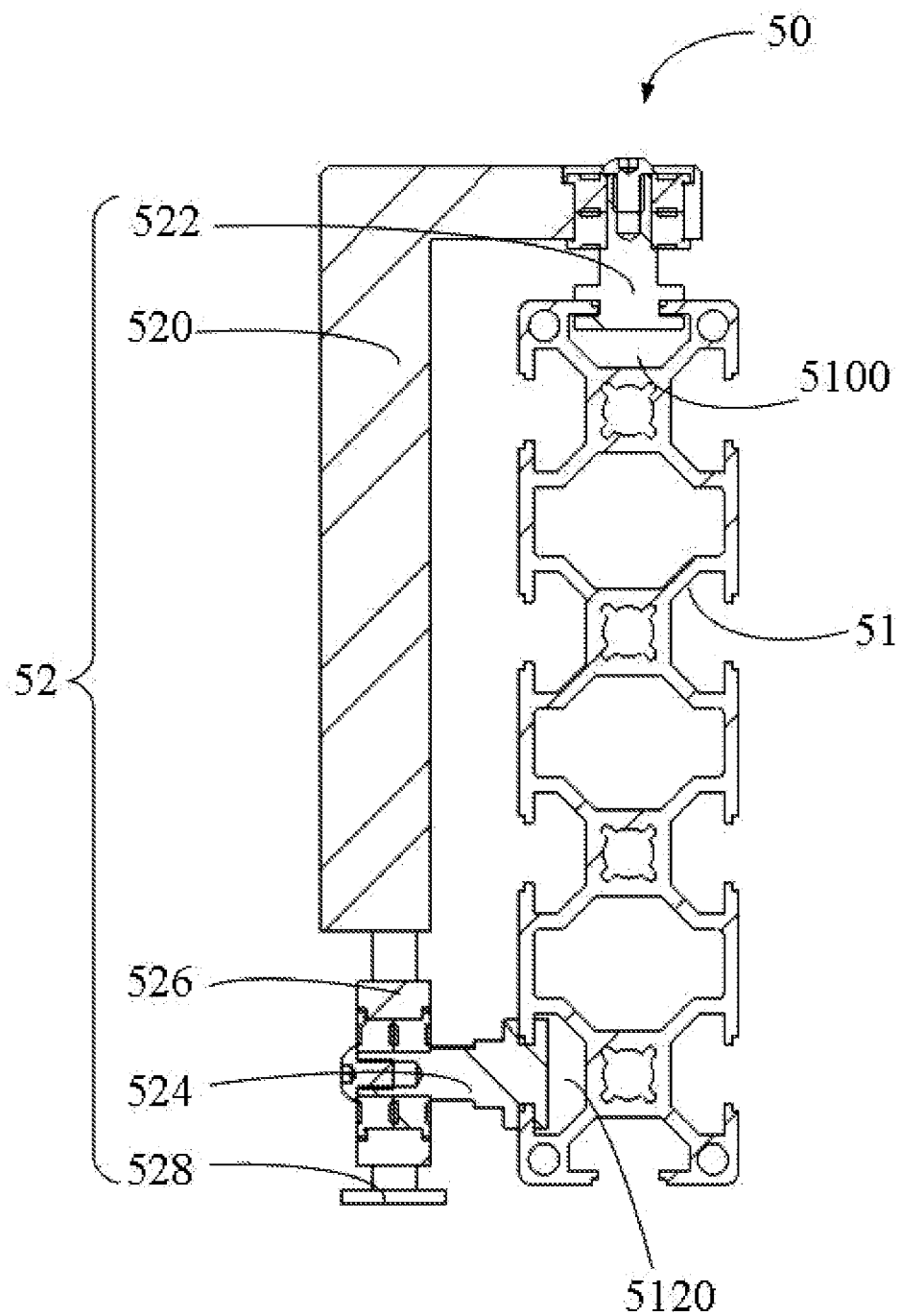
FIG. 20 is a sectional view of the slide apparatus shown in FIG. 18 in a direction I-I.

Referring to FIG. 18 to FIG. 20, the slide apparatus 50 includes a guiderail 51, a slide assembly 52 and a hanging assembly 53. The guiderail 51 may be fixedly mounted at the fixing plate 42 in any suitable manner (for example, the guiderail 51 may be fixedly mounted at the fixing plate 42 in a manner of screw connection) and the guiderail 51 is disposed in the horizontal direction. The slide assembly 52 may be movably mounted at the guiderail 51 and may be slidable along the guiderail 51 (in other words, movable in the horizontal direction with respect to the guiderail 51). The hanging assembly 53 is fixedly mounted at the slide assembly 52 and is slidable with the slide assembly 52 along the guiderail 51.

Figure 21:
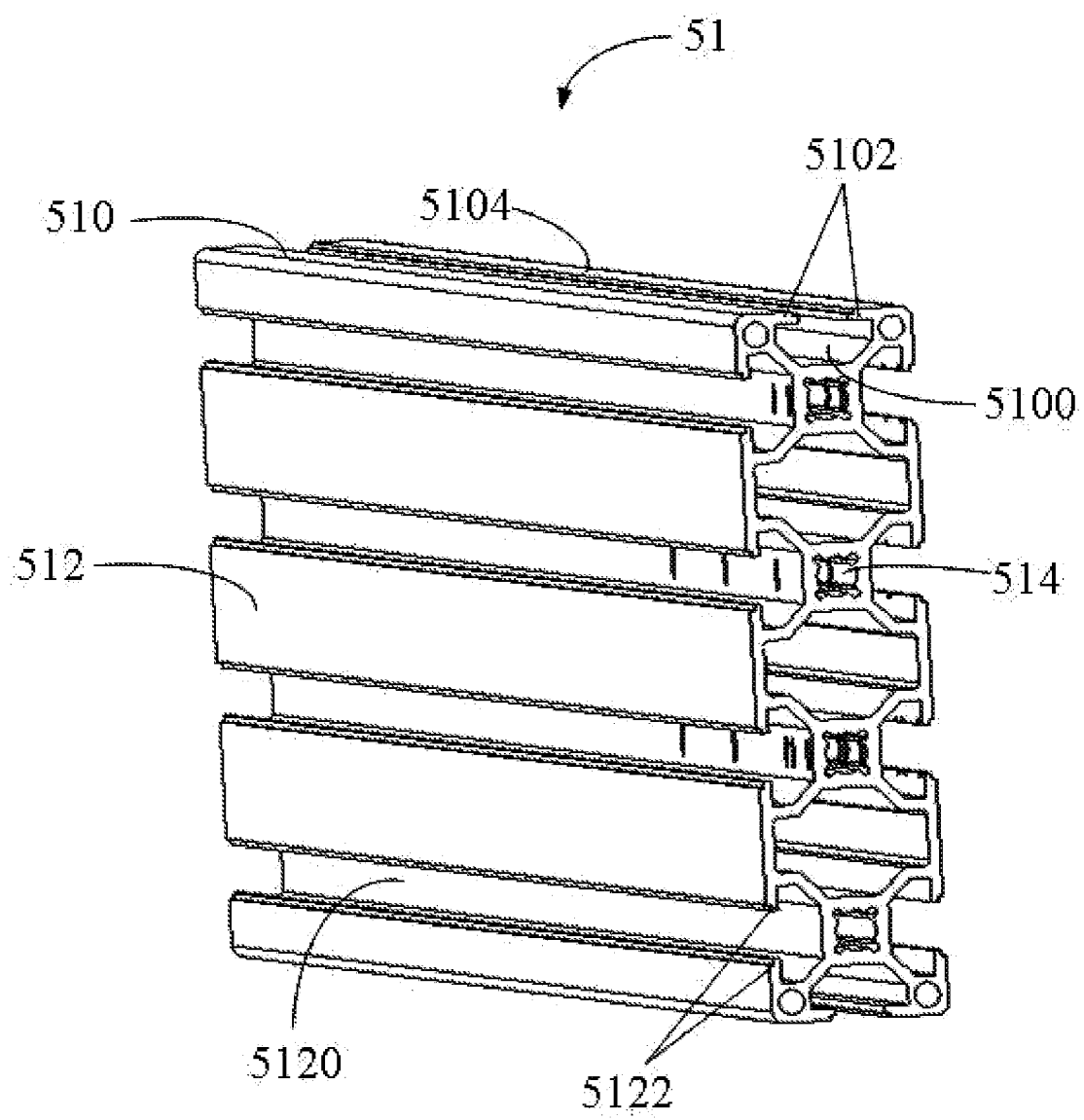
FIG. 21 is a schematic structural view of a guiderail of the slide apparatus shown in FIG. 18.

Specifically, referring to FIG. 21, the guiderail 51 is approximately a cuboid and includes a first surface 510 and a second surface 512 perpendicular to each other. The first surface 510 is perpendicular to the plane in which the fixing plate 42 is located and the second surface 512 is parallel to the plane in which the fixing plate 42 is located and is opposite the fixing plate 42. Particularly, in this embodiment, a plurality of through holes 514 having a predetermined shape is further provided in the guiderail 51 in the horizontal direction and is configured to disperse the stress in the guiderail 51. In addition, the weight of the guiderail 51 is reduced while the rigidity requirement of the guiderail 51 is satisfied. It may be understood that, in some other embodiments, these through holes 514 may be omitted.

A first slide groove 5100 configured to mount the slide assembly 52 is provided in the first surface 510. The first slide groove 5100 extends in the horizontal direction. A cross section of the first slide groove 5100 is approximately "trapezoidal" and a width of the bottom portion of the first slide groove 5100 is less than the width near the opening, so that a frictional area between the slide assembly 52 and the first slide groove 5100 is reduced to enable the slide assembly 52 to slide more smoothly along the first slide groove 5100. Further, in this embodiment, the opening of the first slide groove 5100 has a "T shape" and first clamp portions 5102 extending towards each other are disposed and configured to limit the slide assembly 52, thereby reducing shaking of the slide assembly 52 and preventing the slide assembly 52 from derailing.

In addition, the first surface 510 is further provided with a horizontal graduated scale 5104 with the center of the first surface 510 being the zero point and respectively extends towards two sides. That is, the scale values of the horizontal graduated scale 5104 use the center of the guiderail 51 as the zero point, respectively gradually increase towards two sides of the guiderail 51 and are configured to facilitate positioning of the slide assembly 52. It may be understood that, in some other embodiments, a horizontal graduated scale may be alternatively disposed on the second surface 512, or the horizontal graduated scale 5104 may be omitted.

The second surface 512 is provided with a second slide groove 5120 configured to mount the slide assembly 52. The second slide groove 5120 and the first slide groove 5100 are disposed in parallel. That is, the second slide groove 5120 also extends in the horizontal direction, so that the slide assembly 52 can slide along both the first slide groove 5100 and the second slide groove 5120 and further move in the horizontal direction with respect to the guiderail 51. Similarly, in this embodiment, a cross section of the second slide groove 5120 is also approximately "trapezoidal" and a width of a bottom portion of the second slide groove 5120 is less than a width of the second slide groove 5120 near the opening, so that a frictional area between the slide assembly 52 and the second slide groove 5120 is reduced and the slide assembly 52 can slide along the second slide groove 5120 more smoothly. Further, in this embodiment, the opening of the second slide groove 5120 also has a "T shape" and second clamp portions 5122 extending towards each other are disposed and configured to limit the slide assembly 52, thereby reducing shaking of the slide assembly 52 and preventing the slide assembly 52 from derailing.

In this embodiment, a width of the second surface 512 is greater than a width of the first surface 510. There are four second slide grooves 5120. The four second slide grooves 5120 are disposed in parallel at intervals in the second surface 512. Each second slide groove 5120 may be configured to mount the slide assembly 52. It may be understood that, in some other embodiments, the quantity of the second slide grooves 5120 may be increased or reduced according to an actual requirement. For example, the quantity is reduced to 1, 2, or increased to 5. This is not specifically limited in this embodiment of the present invention. Similarly, in still some other embodiments, a plurality of first slide grooves 5100 may be alternatively disposed on the first surface 510.

It may be understood that, in this embodiment, the cross sections of the first slide groove 5100 and the second slide groove 5120 are approximately "trapezoidal" and the first clamp portions 5102 and the second clamp portions 5122 are respectively disposed at the openings of the first slide groove 5100 and the second slide groove 5120 to enable the slide assembly 52 to slide more smoothly and prevent the slide assembly 52 from derailing. In some other embodiments, the first slide groove 5100 and the second slide groove 5120 may have other suitable structures and are for example, strip-shaped concave grooves or T-shaped concave grooves.

Figure 22:
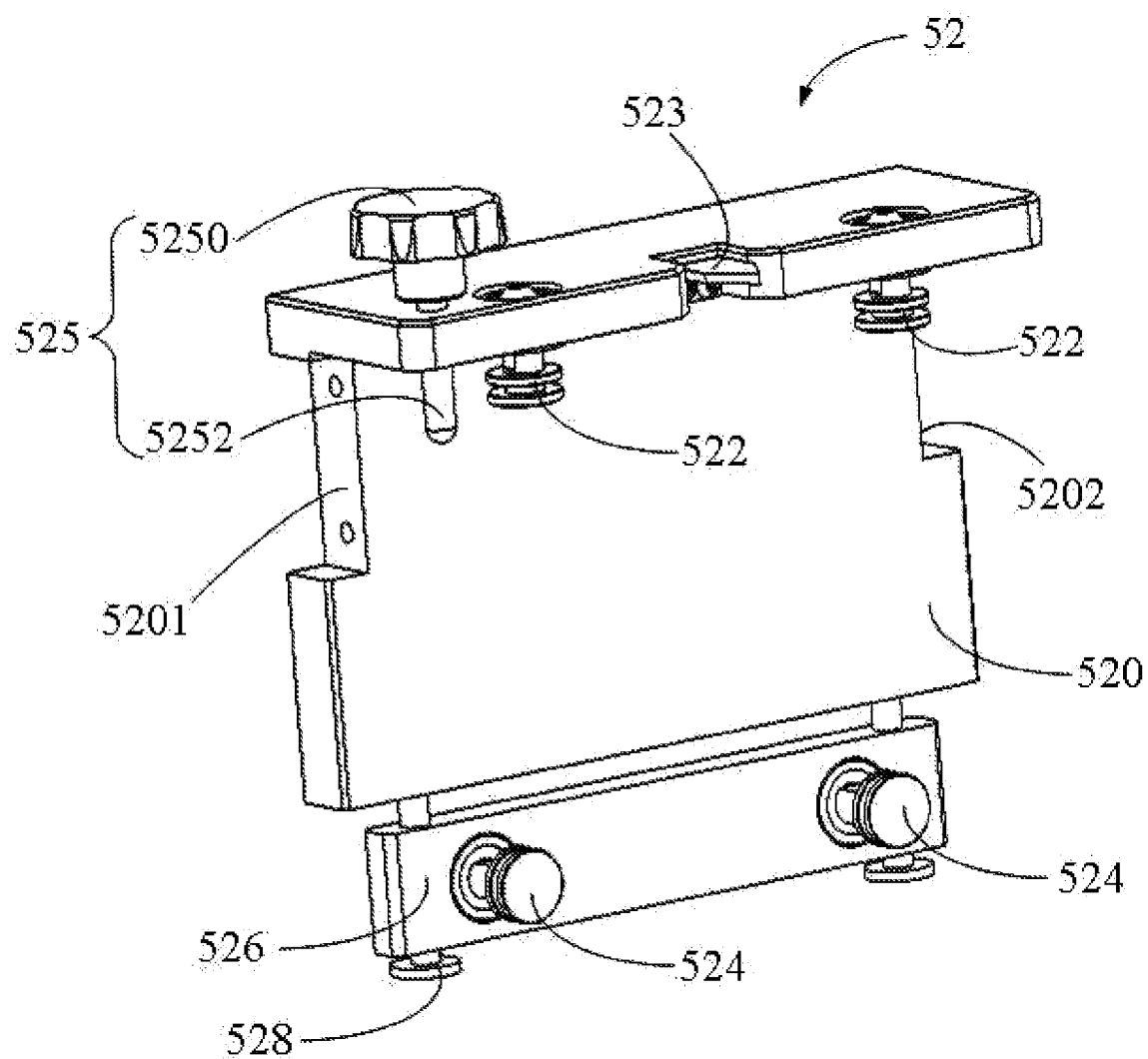
FIG. 22 is a schematic structural view of a slide assembly of the slide apparatus shown in FIG. 18.

Specifically, referring to FIG. 22, the slide assembly 52 includes a plate body 520, a first slide member 522 and a second slide member 524. One end of the first slide member 522 and one end of the second slide member 524 are respectively mounted at the plate body 520. The other end of the first slide member 522 is movably mounted at the first slide groove 5100, the first slide member 522 is slidable along the first slide groove 5100, the other end of the second slide member 524 is movably mounted at the second slide groove 5120 and the second slide member 524 is slidable along the second slide groove 5120, so that the plate body 520 is slidable along the guiderail 51.

The slide assembly 52 further includes a mounting plate 526 and a guide shaft 528. An end of the second slide member 524 is fixedly mounted at the mounting plate 526. The mounting plate 526 is mounted at the plate body 520 through the guide shaft 528 and the mounting plate 526 is movable along the guide shaft 528 with respect to the plate body 520 (in other words, the mounting plate 526 can move along the guide shaft 528 towards or away from the plate body 520). Therefore, when the slide assembly 52 is mounted at the guiderail 51 (that is, the first slide member 522 is mounted at the first slide groove 5100 and the second slide member 524 is mounted at the second slide groove 5120), the guide shaft 528 is adjusted to adjust the distance between the mounting plate 526 and the plate body 520, so that an assembly error between the slide assembly 52 and the guiderail 51 can be adjusted, to enable the slide assembly 52 to slide more smoothly on the guiderail 51. Certainly, in an actual application, the first slide member 522 may be alternatively mounted at the plate body 520 through another pair of the mounting plate 526 and the guide shaft 528. Alternatively, the first slide member 522 and the second slide member 524 are both directly fixedly mounted on the plate body 520.

The plate body 520 is configured to mount the hanging assembly 53, to enable the hanging assembly 53 to slide along the guiderail 51. Specifically, in this embodiment, the plate body 520 is approximately "L-shaped", the first slide member 522 is mounted at one end of the plate body 520 and the second slide member 524 is mounted at the other end of the plate body 520. In the plate body 520, an inner side surface of one end of the first slide member 522 is mounted to face the first surface 510, an inner side surface of one end of the second slide member 524 is mounted to face the second surface 512, so that the first slide member 522 can be movably mounted at the first slide groove 5100 and, the second slide member 524 can be movably mounted at the second slide groove 5120. It may be understood that, in this embodiment, when an "L-shaped" plate body 520 is adopted, the quantity of parts of a slide assembly 52 can be reduced, thereby reducing costs. In some other embodiments, the shape of the plate body 520 may be alternatively not limited to an "L shape". For example, the plate body 520 may alternatively have a panel form and the first slide member 522 is mounted at the plate body 520 through another part.

A scale pointer 523 is disposed on a side, on which the first slide member 522 is mounted, of the plate body 520. After the slide assembly 52 is mounted at the guiderail 51, the scale pointer 523 is located right above the horizontal graduated scale 5104 to facilitate calibration of the position of the plate body 520. Optionally, the scale pointer 523 is disposed at the centerline of the plate body 520 in the horizontal direction. Certainly, it may be understood that, in some other embodiments, if the horizontal graduated scale 5104 is disposed on the second surface 512, the scale pointer 523 is correspondingly disposed on a side, on which the second slide member 524 is mounted, of the plate body 520.

Two opposite sides of the plate body 520 are respectively provided with a first mounting groove 5201 and a second mounting groove 5202 that are configured to mount the hanging assembly 53. The first mounting groove 5201 and the second mounting groove 5202 are aligned in a sliding direction of the plate body 520. In this embodiment, the first mounting groove 5201 and the second mounting groove 5202 are disposed, so that the bearing capability of the plate body 520 in the vertical direction can be improved and the hanging assembly 53 can be more stably and fixedly mounted at the plate body 520. It may be understood that, in some other embodiments, the first mounting groove 5201 and the second mounting groove 5202 may be omitted.

Moreover, the slide assembly 52 further includes a locking member 525 configured to abut the guiderail 51, so that the plate body 520 is fixed at the guiderail 51. In this embodiment, a threaded hole (not shown) is further provided in the side, on which the first slide member 522 is mounted, of the plate body 520 and is configured to mount the locking member 525. Specifically, the locking member 525 may include a knob 5250 and a threaded rod 5252. The knob 5250 is fixed at one end of the threaded rod 5252 and the other end of the threaded rod 5252 may pass through the threaded hole to abut or leave the guiderail 51. Specifically, when a user tightens the knob 5250 to enable the other end of the threaded rod 5252 to abut the guiderail 51, the plate body 520 may be fixed at the guiderail 51. When the user loosens the knob 5250 to enable the other end of the threaded rod 5252 to leave the guiderail 51, the plate body 520 may slide with respect to the guiderail 51 to facilitate readjustment of the position of the plate body 520. Similarly, it may be understood that, in some other embodiments, the locking member 525 may be alternatively mounted at another suitable position of the plate body 520, for example, mounted on the side, on which the second slide member 524 is mounted, of the plate body 520. In addition, the specific structure of the locking member 525 may be not limited to the structure described in the foregoing, provided that the plate body 520 can be fixed or moved with respect to the guiderail 51.

There are two first slide members 522. The two first slide members 522 are horizontally arranged along the first slide groove 5100.

Figure 23:
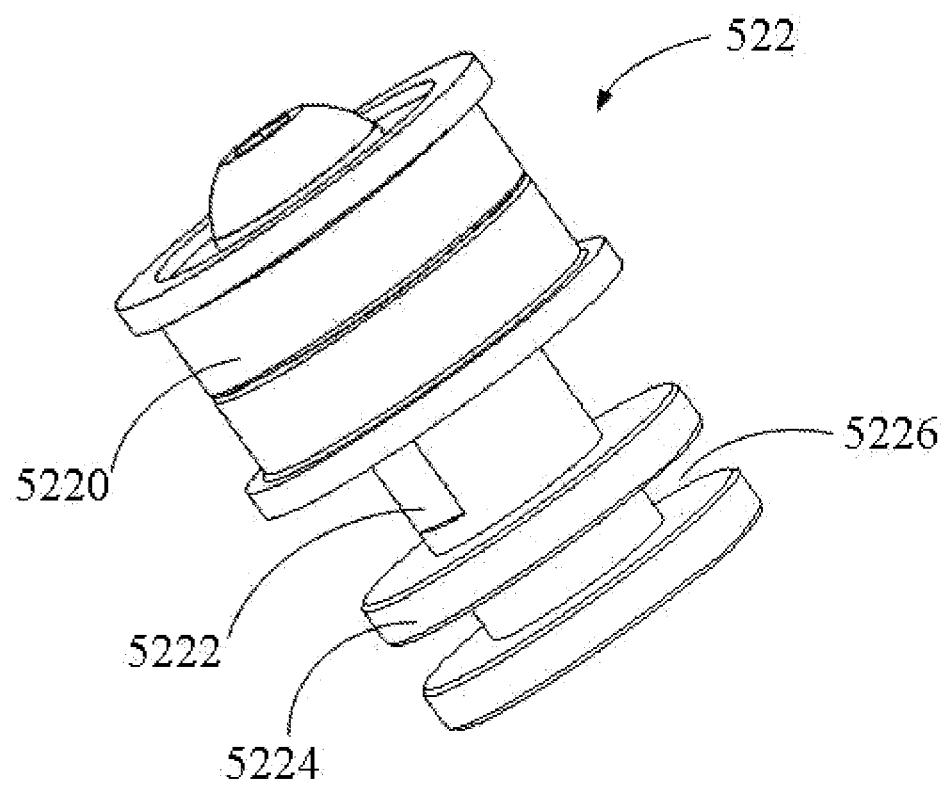
FIG. 23 is a schematic structural view of a first slide member of the slide assembly shown in FIG. 22.

Specifically, referring to FIG. 23, the first slide member 522 includes a first bearing 5220, a first pin shaft 5222 and a first roller 5224. The first bearing 5220 is sleeved over one end of the first pin shaft 5222 and the first roller 5224 is disposed at the other end of the first pin shaft 5222. The first bearing 5220 is fixedly mounted at the plate body 520. The first roller 5224 is movably mounted at the first slide groove 5100 and can roll along the first slide groove 5100. In an actual application, the first pin shaft 5222 is rotatable with respect to the first bearing 5220 and/or, the first roller 5224 is rotatable with respect to the first pin shaft 5222. This is not specifically limited in this embodiment of the present invention.

The first roller 5224 has an "H shape" and is provided with a first annular concave groove 5226. After the first slide member 522 is mounted at the first slide groove 5100, as shown in FIG. 20, the first clamp portions 5102 of the first slide groove 5100 are claimed in the first annular concave groove 5226 and the first roller 5224 can roll along the first clamp portions 5102.

There are also two second slide members 524. The two second slide members 524 are horizontally arranged along the second slide groove 5120. Particularly, in this embodiment, the two second slide members 524 are disposed at an end away from the first surface 510 (that is, disposed in a second slide groove 5120 away from the first surface 510) and are configured to balance the force applied to the plate body 520, thereby improving the load capability of the plate body 520. In some other embodiments, the second slide members 524 may be alternatively disposed in another second slide groove 5120, provided that the second slide members 524 can slide in the horizontal direction with respect to the guiderail 51.

Figure 24:
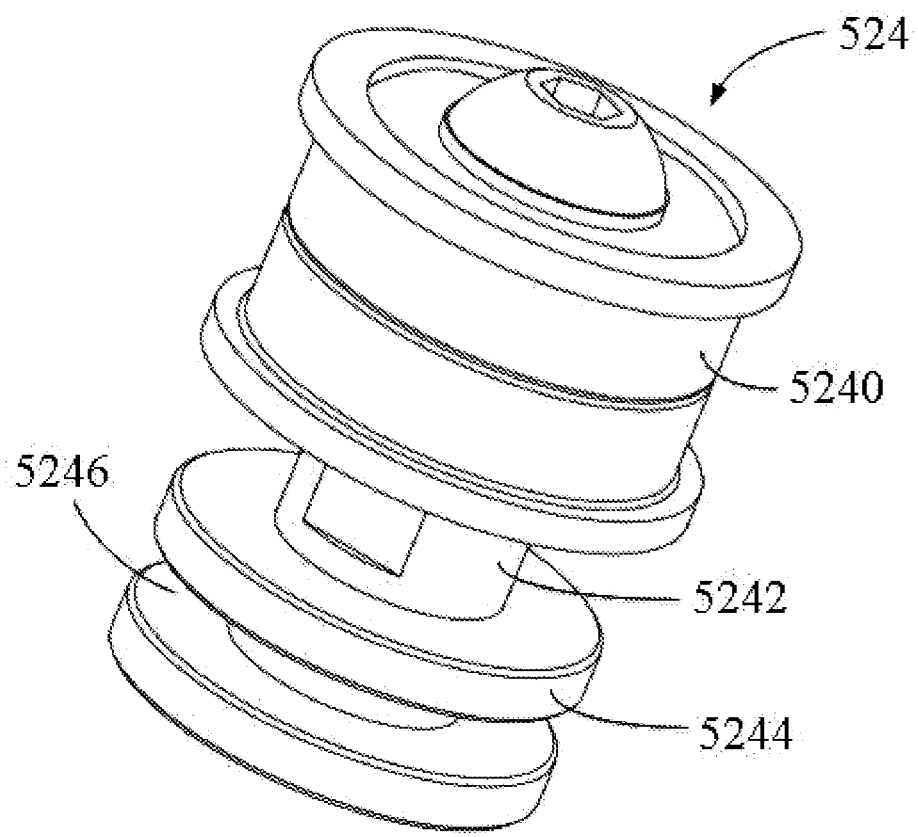
FIG. 24 is a schematic structural view of a second slide member of the slide assembly shown in FIG. 22.

Specifically, referring to FIG. 24, the structure of the second slide member 524 is the same as the structure of the first slide member 522 and the second slide member 524 includes a second bearing 5240, a second pin shaft 5242 and a second roller 5244. The second bearing 5240 is sleeved over one end of the second pin shaft 5242 and the second roller 5244 is disposed at the other end of the second pin shaft 5242. The second bearing 5240 is fixedly mounted at the mounting plate 526 and the second roller 5244 is movably mounted at the second slide groove 5120 and can roll along the second slide groove 5120. Similarly, in an actual application, the second pin shaft 5242 is rotatable with respect to the second bearing 5240 and/or, the second roller 5244 is rotatable with respect to the second pin shaft 5242. This is not specifically limited in this embodiment of the present invention.

The second roller 5244 has an "H shape" and is provided with a second annular concave groove 5246. After the second slide member 524 is mounted at the second slide groove 5120, as shown in FIG. 20, the second clamp portions 5122 of the second slide groove 5120 is clamped at the second annular concave groove 5246 and the second roller 5244 can roll along the second clamp portions 5122.

It may be understood that, in this embodiment, there are two first slide members 522 and the two first slide members 522 are horizontally disposed along the first slide groove 5100. There are also two second slide members 524 and the two second slide members 524 are horizontally disposed along the second slide groove 5120, so that the load capability of the plate body 520 is improved and the plate body 520 can slide more stably on the guiderail 51, thereby improving the reliability of the slide assembly 52. In some other embodiments, the quantity of the first slide members 522 and the quantity of the second slide members 524 may be set according to an actual requirement. For example, one first slide member 522 and two second slide members 524 may be included. The first slide member 522 is disposed at the centerline between the two second slide members 524 to form a stable triangular structure. Alternatively, only one first slide member 522 and one second slide member 524 are included. In still some other embodiments, to further inhibit the plate body 520 from turning over in the horizontal direction, a third slide member may further be disposed on another lateral surface (that is, the surface opposite the first surface 510) perpendicular to the second surface 512.

It may be understood that, in this embodiment, the first slide member 522 and the second slide member 524 are both combined structures of a bearing, a pin shaft and a roller to use a rolling manner to reduce a frictional force between the slide assembly 52 and the guiderail 51, to enable the slide assembly 52 to move more smoothly with respect to the guiderail 51. In addition, the first roller 5224 and the second roller 5244 both have an "H" shape. The first roller 5224 is provided with the first annular concave groove 5226 and the second roller 5244 is provided with the second annular concave groove 5246 for respective adaptation with the first clamp portions 5102 in the first slide groove 5100 and the second clamp portions 5122 in the second slide groove 5120, thereby reducing a frictional force between a roller and a slide groove and limiting a roller to prevent the roller from derailing. In some other embodiments, the first slide member 522 and/or the second slide member 524 may adopt another structure, provided that the first slide member 522 and/or the second slide member 524 is slidable along the guiderail 51 slide horizontally. For example, the first slide member 522 may be a first slide block and the first slide block is accommodated in the first slide groove 5100 and is slidable along the first slide groove 5100; and/or, the second slide member 524 may be a second slide block and the second slide block is accommodated in the second slide groove 5120 and is slidable along the second slide groove 5120.

Figure 25:
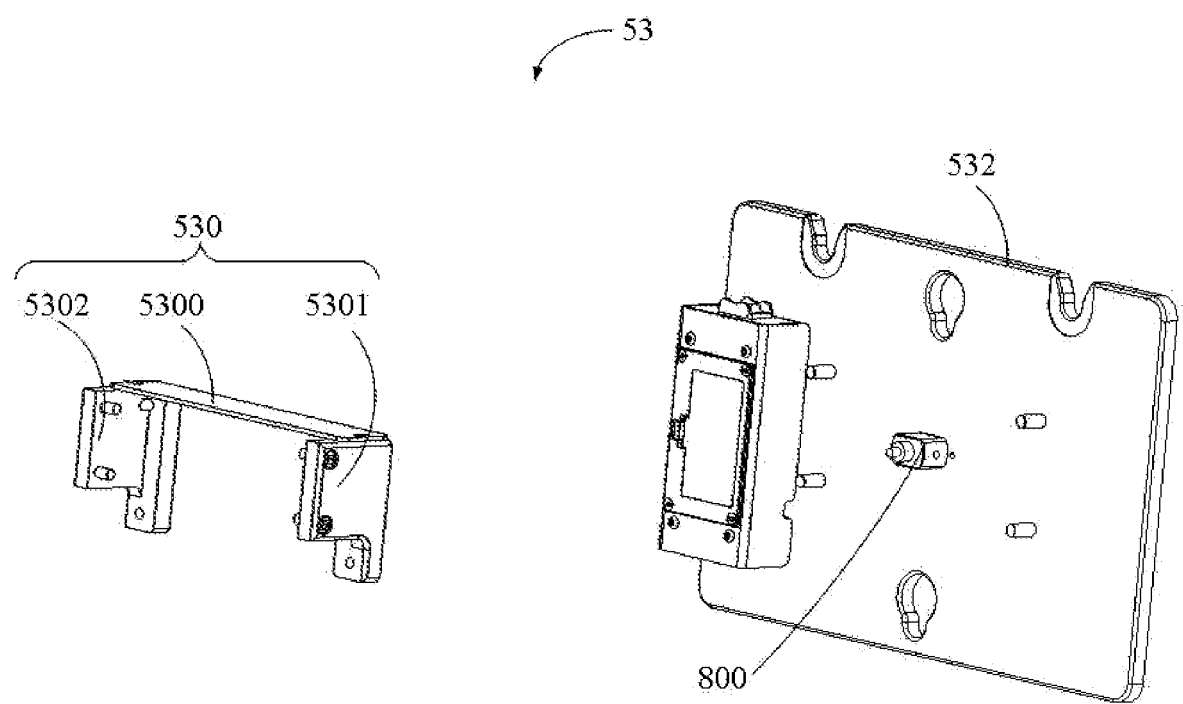
FIG. 25 is an exploded view of a hanging assembly of the slide apparatus shown in FIG. 18.
Figure 26:
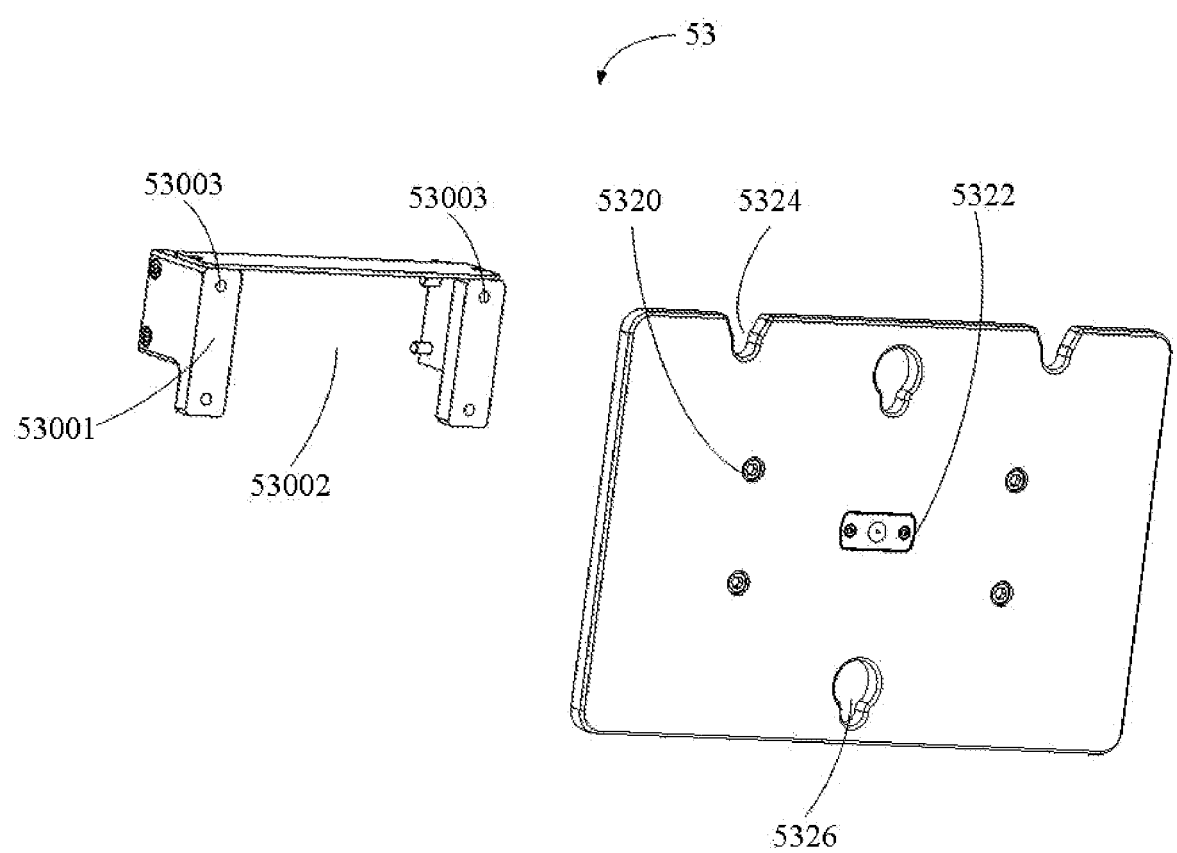
FIG. 26 is an exploded view of the hanging assembly shown in FIG. 25 from another angle.

Referring to FIG. 18, FIG. 25 and FIG. 26 together, the hanging assembly 53 includes a mounting member 530 and a hanging member 532. The hanging member 532 is fixedly mounted at the plate body 520 through the mounting member 530.

Specifically, the mounting member 530 includes a base portion 5300, a first extending portion 5301 and a second extending portion 5302. The first extending portion 5301 and the second extending portion 5302 respectively extend from two opposite sides of the base portion 5300. An end, away from the base portion 5300, the first extending portion 5301 is inserted in the first mounting groove 5201 and is fixedly connected to the plate body 520. An end, away from the base portion 5300, the second extending portion 5302 is inserted in the second mounting groove 5202 and is fixedly connected to the plate body 520.

The base portion 5300 has a mounting surface 53001. The mounting surface 53001 is provided with a receiving groove 53002 and a plurality of mounting holes 53003. The plurality of mounting holes 53003 are arranged surrounding the receiving groove 53002.

The hanging member 532 is provided with a plurality of connecting through holes 5320 corresponding to the mounting holes 53003. The plurality of connecting through holes 5320 is configured to fixedly mount the hanging member 532 at the mounting member 530. After the hanging member 532 is mounted at the mounting surface 53001, the receiving groove 53002 may be closed to form an accommodating space.

A laser mounting hole 5322 is provided in the middle of the hanging member 532 and is configured to mount a calibration laser 800. After the calibration laser 800 is mounted at the hanging member 532, a part of the calibration laser 800 is accommodated in the accommodating space.

The hanging member 532 has a rectangular plate form. A notch 5324 is provided in a side of the hanging member 532 and is configured to hang a calibration assistance device (for example, a radar calibration plate and a reflector). A hanging hole 5326 is further provided in the hanging member 532 and is configured to hang another calibration assistance device (for example, a night vision device and a blind spot monitor). In the hanging manner, it may be simpler to mount a calibration assistance device and the support apparatus 10, thereby improving user experience.

In some embodiments, the hanging assembly 53 may be omitted. The calibration laser 800 and/or the calibration assistance device are/is mounted at the plate body 520 in another manner.

Figure 27:
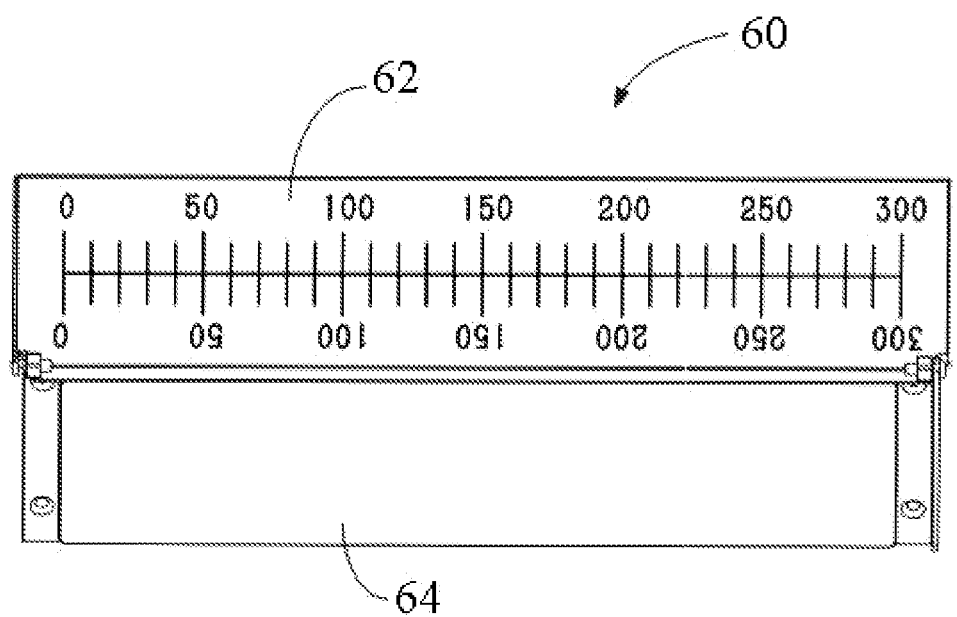
FIG. 27 is a schematic structural view of a scale apparatus of the automobile calibration device shown in FIG. 1.

Referring to FIG. 3 and FIG. 27 together, there are two scale apparatuses 60. The two scale apparatuses 60 are respectively mounted at two opposite ends of the guiderail 51 and the two scale apparatuses 60 are symmetrically disposed with respect to the centerline of O1 of the guiderail 51. Each scale apparatus 60 includes a scale plate 62 and a reflector 64. The scale plate 62 is connected to the reflector 64 and the scale plate 62 is located right above the reflector 64. The reflector 64 is configured to reflect a laser beam. The scale plate 62 is configured to determine that the laser beam is projected at the position of the reflector 64.

Figure 28:
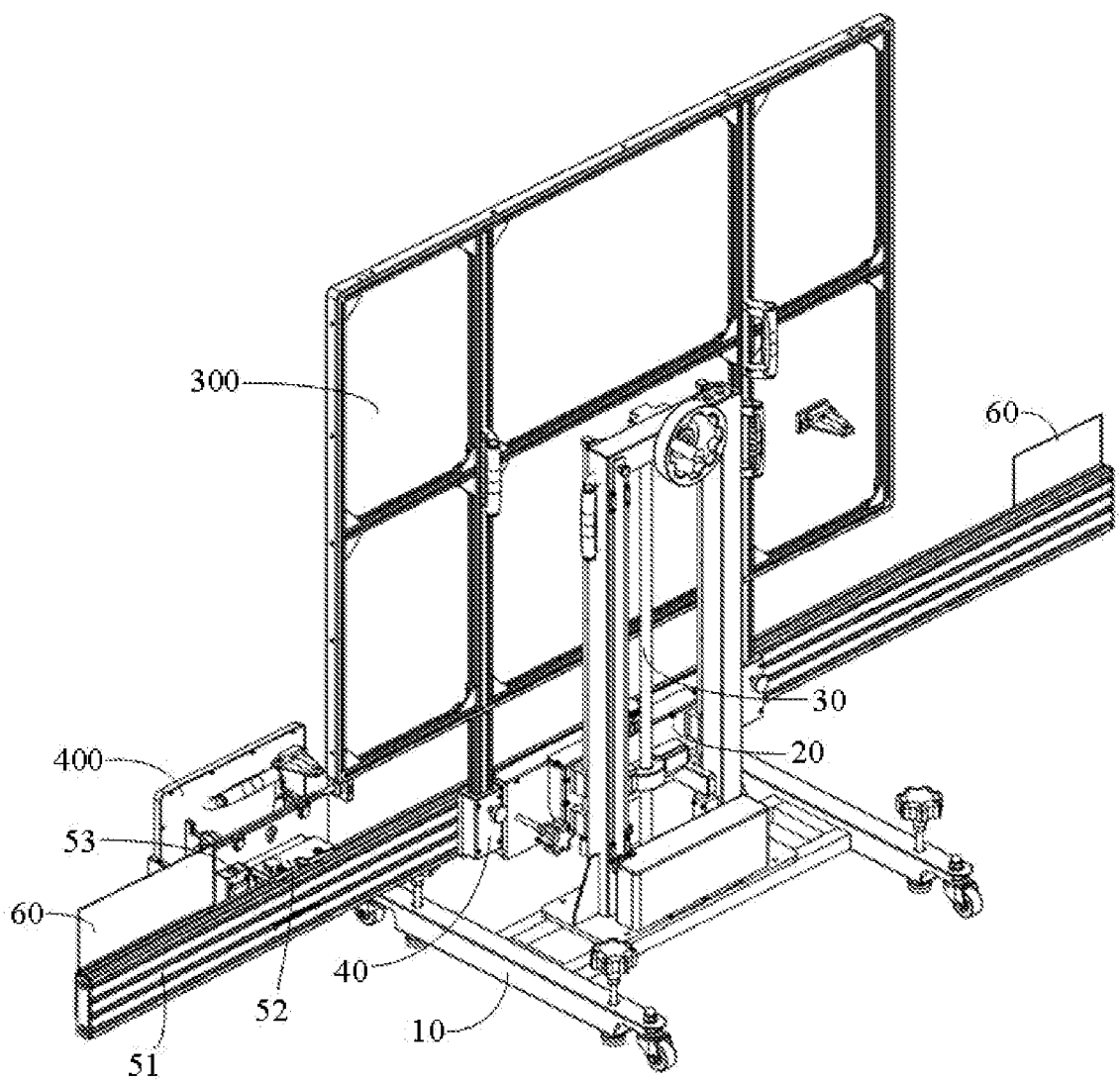
FIG. 28 is a diagram showing a use state of the automobile calibration device shown in FIG. 1.

Referring to FIG. 28, during use, a fixing rod of a pattern plate 300 may be inserted in the clamping apparatus 40 and a radar calibration plate 400 may be hung at the hanging member 532. By using the position adjustment apparatus 20, the horizontal position of the clamping apparatus 40 can be precisely adjusted, so that the pattern plate 300 can be moved to a required position. The slide assembly 52 slides along the guiderail 51, so that the radar calibration plate 400 can be moved to the required position.

Figure 29:
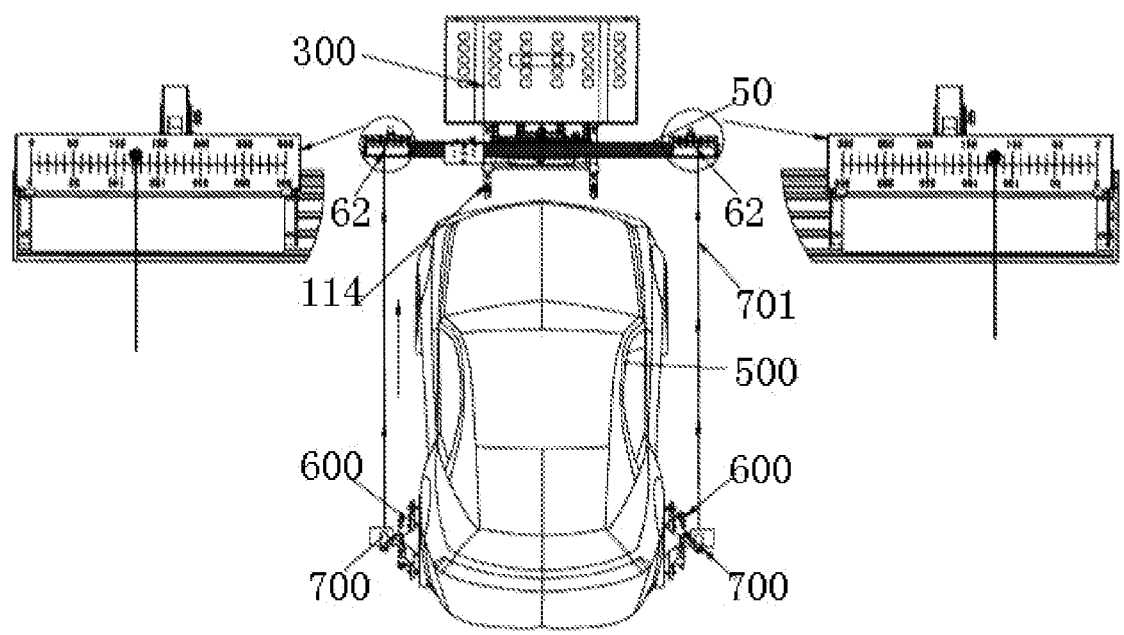
FIG. 29 is a schematic view of using the automobile calibration device provided in the embodiment of the present invention to calibrate an automobile to be calibrated.

Referring to FIG. 29 together, the calibration of the centerline of an automobile 500 to be calibrated by using the automobile calibration device 100 is specifically as follows:

Before calibration, the automobile calibration device 100 is moved right in front of the automobile 500 to be calibrated and four height adjustment members 114 are rotated down to enable the roller 112 to leave the ground, so that the support apparatus 10 can be stably fixed right in front of the automobile 500 to be calibrated.

One hub clamp 600 is mounted at each rear wheel of the automobile 500 to be calibrated. A point laser 700 is configured on each hub clamp 600. Each point laser 700 is configured to emit a point laser beam 701 to a corresponding scale plate 62. The ascending button 3222 or the descending button 3224 is triggered to enable each scale plate 62 to be approximately in the same horizontal plane as a corresponding point laser 700.

Two scale plates 62 are adjusted according to the width of the automobile 500 to be calibrated. Each point laser 700 is turned on, so that the point laser 700 emits a point laser beam 701 to a corresponding scale plate 62. A specific position of the emitted point laser beam 701 on the scale plate 62 is observed and the adjustment member 24 is adjusted to enable the scale plate 62 to move horizontally, until the reading of the point laser beam 701 on the scale plate 62 is consistent. In this case, the centerline of the automobile 500 to be calibrated is aligned with the centerline of the guiderail 51 and the pattern plate 300 may be configured to calibrate the camera of the automobile 500 to be calibrated.

Finally, it should be noted that the above embodiments are merely provided for describing the technical solutions of the present invention, but not intended to limit the present invention. In the concept of the present invention, in the foregoing embodiments or different embodiments, technical features may be combined, steps may be implemented in any sequence and many another variations in different aspects of the present invention may exist. For brevity, these are not provided in the details. It should be understood by a person of ordinary skill in the art that although the present invention has been described in detail with reference to the embodiments, modifications can be made to the technical solutions described in the embodiments, or equivalent replacements can be made to some technical features in the technical solutions, as long as such modifications or replacements do not depart from the scope of the present invention.

What is claimed is:

1. An automobile calibration device, comprising:
  a support apparatus;
  a position adjustment apparatus, the position adjustment apparatus being mounted at the support apparatus; and
  a slide apparatus, the slide apparatus being mounted at the position adjustment apparatus and being configured to mount a vehicle calibration apparatus;
  wherein the position adjustment apparatus is configured to enable the slide apparatus to move horizontally;
  wherein the position adjustment apparatus comprises:
    a slide member;
    a supporting member, the supporting member being movably mounted at the slide member, one of the slide member and the supporting member comprising a first member; and
    an adjustment member, the adjustment member comprising a second member, the second member being meshed with the first member and being capable of driving the first member to move in a preset direction, to enable the supporting member to move in the preset direction with respect to the slide member;
  wherein the slide apparatus comprises a guiderail and a slide assembly;
    the guiderail is mounted at the position adjustment apparatus; and
    the slide assembly is mounted at the guiderail and the slide assembly is horizontally movable with respect to the guiderail;
  wherein the guiderail comprises a first surface and a second surface perpendicular to each other, the first surface being provided with a first slide groove, the second surface being provided with a second slide groove and the first slide groove and the second slide groove being disposed in parallel;
    the slide assembly comprises a plate body, a first slide member and a second slide member, the first slide member and the second slide member being mounted at the plate body; and
    the first slide member is movably mounted at the first slide groove, the first slide member is slidable along the first slide groove, the second slide member is movably mounted at the second slide groove and the second slide member is slidable along the second slide groove, so that the plate body is slidable along the guiderail.

2. The automobile calibration device according to claim 1, wherein the adjustment member comprises a rod body, a knob portion and the second member;
  the rod body passes through the slide member, and the rod body is rotatable with respect to the slide member; and
  the second member and the knob portion are respectively disposed at two ends of the rod body, the knob portion is capable of driving the rod body to rotate, so that the second member drives the first member to move in a horizontal direction.

3. The automobile calibration device according to claim 1, wherein the first member comprises a rack; the second member comprises a gear corresponding to the rack.

4. The automobile calibration device according to claim 1, wherein the position adjustment apparatus further comprises a connection assembly, the supporting member being mounted at the slide member via the connection assembly.

5. The automobile calibration device according to claim 4, wherein the connection assembly comprises a linear slide rail and a plurality of slide rail fixing blocks, one of the linear slide rail and the plurality of slide rail fixing blocks being mounted at the slide member and the other of the linear slide rail and the plurality of slide rail fixing blocks being mounted at the supporting member;
  the linear slide rail is disposed in the preset direction; and
  the plurality of slide rail fixing blocks are sleeved over the linear slide rail, the plurality of slide rail fixing blocks being slidable in the preset direction with respect to the linear slide rail.

6. The automobile calibration device according to claim 5, wherein the plurality of slide rail fixing blocks comprise two slide rail fixing blocks, the two slide rail fixing blocks are arranged in the preset direction and the two slide rail fixing blocks are both sleeved over the linear slide rail.

7. The automobile calibration device according to claim 1, further comprising:
  a drive assembly, configured to drive the position adjustment apparatus to move in a vertical direction with respect to the support apparatus.

8. The automobile calibration device according to claim 7, wherein the drive assembly comprises a first drive mechanism and a transmission mechanism;
  the first drive mechanism is connected to the transmission mechanism and the first drive mechanism is configured to drive the transmission mechanism to move; and
  the transmission mechanism is configured to enable the position adjustment apparatus to move in the vertical direction with respect to the support apparatus.

9. The automobile calibration device according to claim 8, wherein
  the transmission mechanism comprises an elevation screw rod, the elevation screw rod being movably mounted at the support apparatus, the elevation screw rod being disposed vertically and the elevation screw rod being rotatable around a central axis of the elevation screw rod;

the slide member is sleeved over the elevation screw rod, the elevation screw rod being threaded to the slide member; and the first drive mechanism is connected to the elevation screw rod and the first drive mechanism is configured to drive the elevation screw rod to rotate around the central axis of the elevation screw rod, to enable the position adjustment apparatus to move in the vertical direction with respect to the support apparatus.

10. The automobile calibration device according to claim 9, wherein the first drive mechanism comprises a motor assembly; and the motor assembly comprises a motor, the motor being configured to drive the elevation screw rod to rotate around the central axis of the elevation screw rod.

11. The automobile calibration device according to claim 10, wherein the motor assembly further comprises a first synchronous gear, a second synchronous gear, and a drive belt;

the motor is fixedly mounted at the support apparatus, the first synchronous gear is fixedly mounted at a rotating shaft of the motor, the second synchronous gear is fixedly mounted at the elevation screw rod and the drive belt is sleeved over the first synchronous gear and the second synchronous gear; and when the rotating shaft of the motor rotates, the first synchronous gear drives the second synchronous gear through the drive belt to rotate, to enable the elevation screw rod to rotate around the central axis of the elevation screw rod.

12. The automobile calibration device according to claim 11, wherein when the rotating shaft of the motor rotates in a first rotational direction, the position adjustment apparatus ascends in the vertical direction with respect to the support apparatus;

when the rotating shaft of the motor rotates in a second rotational direction, the position adjustment apparatus descends in the vertical direction with respect to the support apparatus; and the first rotational direction and the second rotational direction are opposite.

13. The automobile calibration device according to claim 11, wherein the drive belt comprises an assembly surface, and each of a peripheral surface of the first synchronous gear and a peripheral surface of the second synchronous gear is provided with gear teeth, the gear teeth of the first synchronous gear and the gear teeth of the second synchronous gear being both in contact with the assembly surface, and the assembly surface comprising a toothed area and a non-toothed area;

the toothed area is capable of being meshed with the first synchronous gear and the second synchronous gear and the non-toothed area is capable of being in contact with the first synchronous gear and the second synchronous gear;

when the rotating shaft of the motor rotates and the toothed area is meshed with the first synchronous gear or the second synchronous gear, a rate of the second synchronous gear is a first preset rate value;

when the rotating shaft of the motor rotates and the first synchronous gear and the second synchronous gear are only in contact with the non-toothed area, a rate of the second synchronous gear is a second preset rate value; and the first preset rate value is greater than the second preset rate value.

14. The automobile calibration device according to claim 9, further comprising a second drive mechanism, wherein the second drive mechanism comprises a first helical gear, a second helical gear, and an elevation handwheel;

the elevation handwheel is mounted at the support apparatus, the first helical gear is fixedly connected to the elevation handwheel and the second helical gear is fixedly connected to the elevation screw rod, the first helical gear being meshed with the second helical gear; and an angle is formed between a rotational axis of the elevation handwheel and the vertical direction.

15. The automobile calibration device according to claim 9, wherein the slide member comprises a slide member body and a slide block; and the slide block is fixedly mounted at the slide member body and a threaded through hole is opened in the slide block, the threaded through hole being sleeved over the elevation screw rod and the threaded through hole being threaded to the elevation screw rod.

16. The automobile calibration device according to claim 15, wherein the slide member comprises a guide block, the guide block being fixedly mounted at the slide member body;

the support apparatus comprises an elevation guiderail, the elevation guiderail being disposed vertically; and the guide block is sleeved over the elevation guiderail.

17. The automobile calibration device according to claim 1, wherein the slide apparatus further comprises a hanging assembly; and the hanging assembly comprises a mounting member and a hanging member, the hanging member being fixedly mounted at the plate body through the mounting member.

* * * * *